(12) United States Patent
Iwasa et al.

(10) Patent No.: US 6,583,550 B2
(45) Date of Patent: Jun. 24, 2003

(54) FLUORESCENT TUBE WITH LIGHT EMITTING DIODES

(75) Inventors: Tadanobu Iwasa, Nishikasugai-gun (JP); Shinji Takano, Nishikasugai-gun (JP)

(73) Assignee: Toyoda Gosei Co., Ltd., Nishikasugai-gun (JP)

( * ) Notice: Subject to any disclaimer, the term of this patent is extended or adjusted under 35 U.S.C. 154(b) by 0 days.

(21) Appl. No.: 09/983,211

(22) Filed: Oct. 23, 2001

(65) Prior Publication Data

US 2002/0047516 A1 Apr. 25, 2002

(30) Foreign Application Priority Data

Oct. 24, 2000 (JP) .......................................... 2000-324129
Mar. 28, 2001 (JP) .......................................... 2001-091960

(51) Int. Cl.[7] .................................................. H01J 1/62
(52) U.S. Cl. ........................................ 313/485; 373/512
(58) Field of Search ................................. 313/483, 485, 313/498, 509, 512

(56) References Cited

U.S. PATENT DOCUMENTS 6,283,612 B1 * 9/2001 Hunter ........................ 362/240

* cited by examiner

Primary Examiner—Vip Patel
(74) Attorney, Agent, or Firm—McGinn & Gibb, PLLC

(57) ABSTRACT

A fluorescent tube is constituted by a fluorescent tubular body having a transparent glass tube coated with a fluorescent layer containing a fluorescent material on its inner surface, and an ultraviolet LED substrate inserted in the fluorescent tubular body and having an equal length to the fluorescent tubular body. The ultraviolet LED substrate has twenty-four ultraviolet light emitting devices each having a long life, and the left end of the ultraviolet LED substrate is connected with lead wires through which electric power is supplied. Accordingly, when ultraviolet rays are emitted from the twenty-four ultraviolet light emitting devices, the fluorescent layer emits light in its own fluorescent color, the fluorescent tubular body as a whole emits light and the surroundings are illuminated with the light. Hence, the fluorescent tube can be used for illumination. Alternatively, the fluorescent tubular body may be formed by a transparent silicone rubber which can be bent into any desired shape.

24 Claims, 9 Drawing Sheets

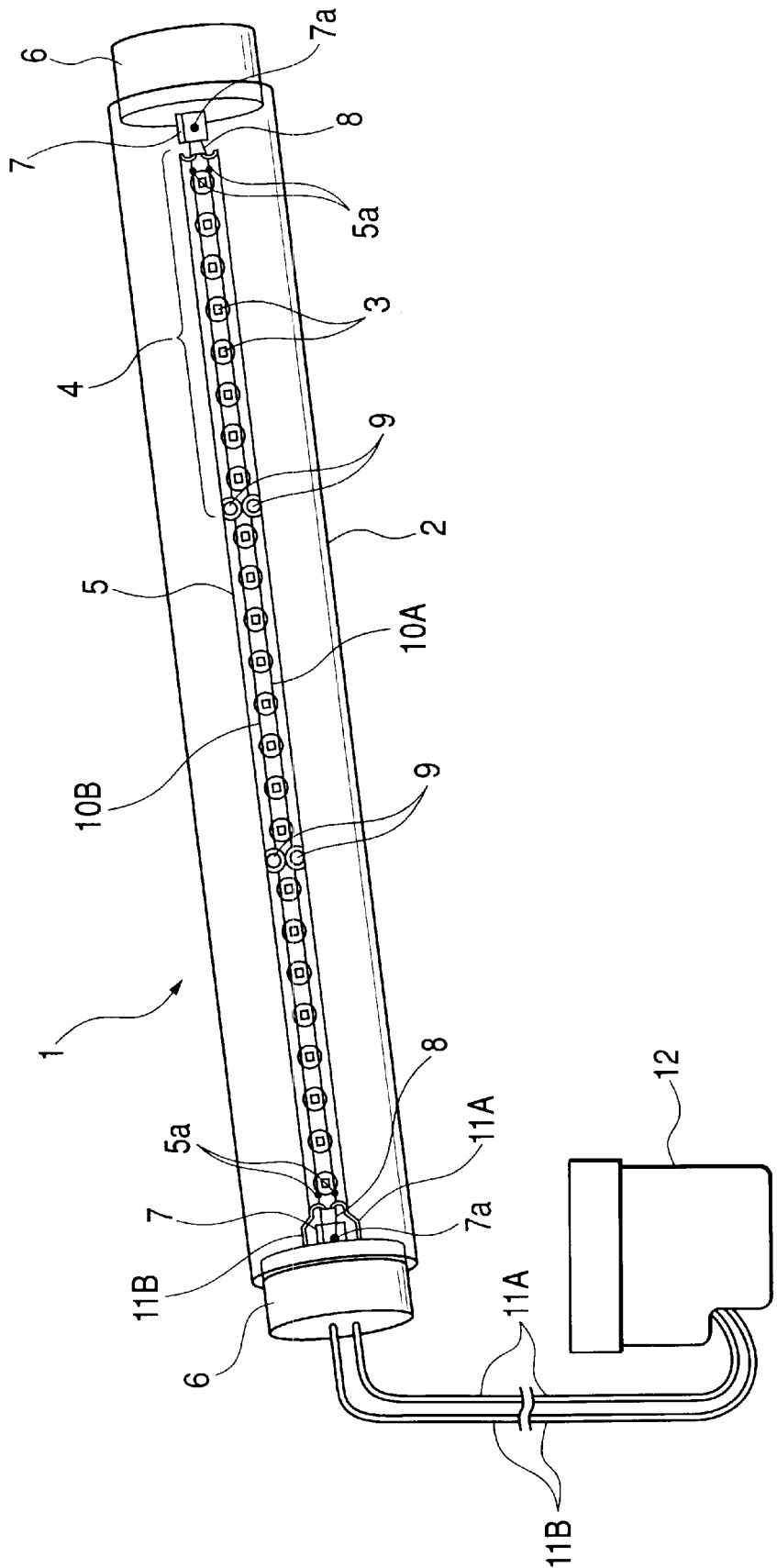

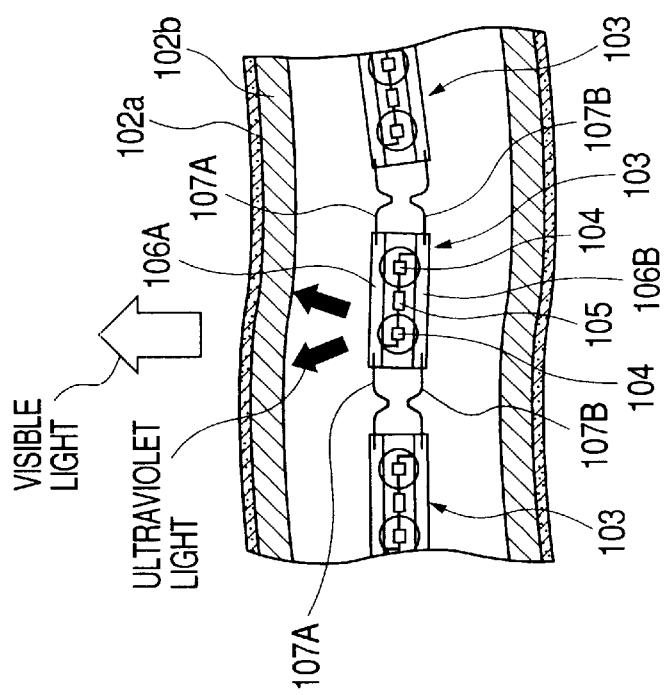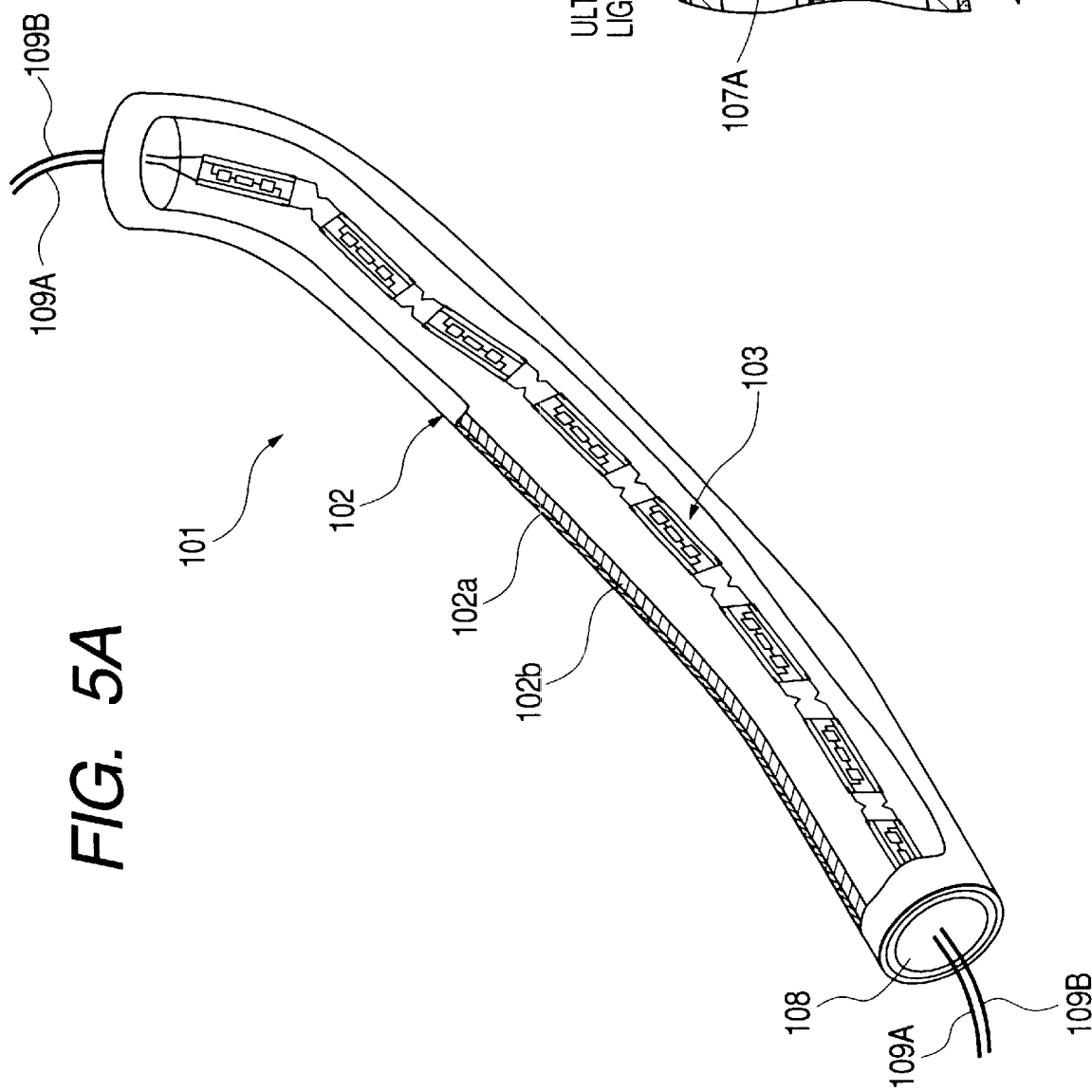

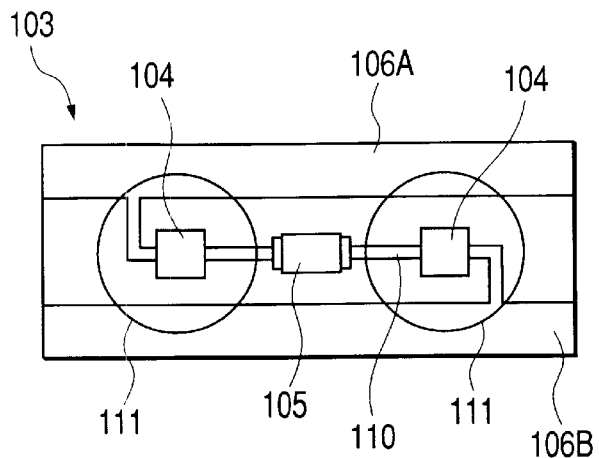
FIG. 6A
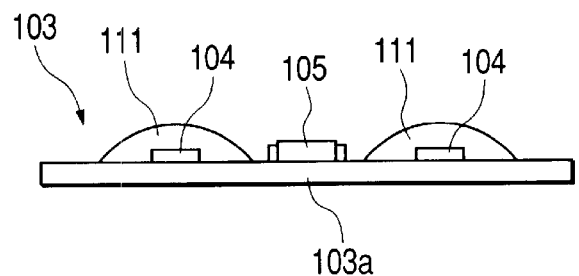
FIG. 6B
FIG. 6C
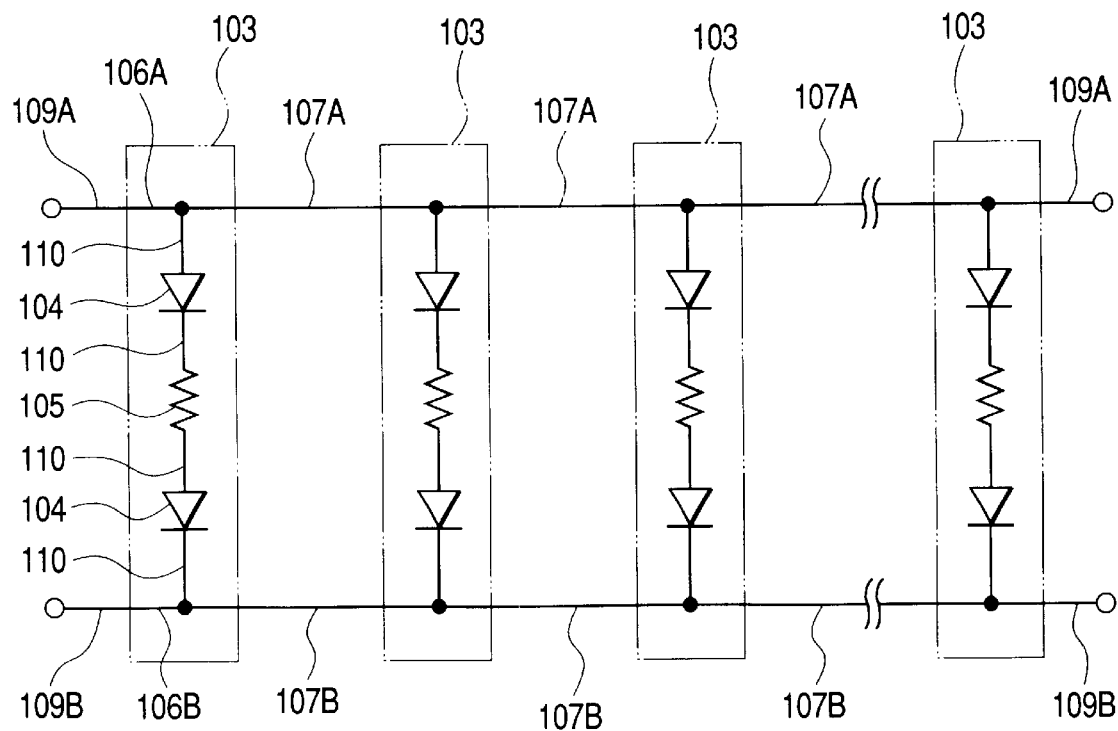

FLUORESCENT TUBE WITH LIGHT EMITTING DIODES

BACKGROUND OF THE INVENTION

1. Field of the Invention

The present invention relates to a fluorescent tube in which a fluorescent tubular body emitting light in response to irradiation with ultraviolet rays is irradiated with ultraviolet rays of a plurality of ultraviolet light emitting diodes (hereinafter also abbreviated to "ultraviolet LED") inserted in the fluorescent tubular body. Thus, the fluorescent tube can make various kinds of illumination or light expression in place of a background-art fluorescent lamp.

Incidentally, in this specification, an LED chip itself will be referred to as "light emitting device", and the whole of a light emitting unit including a resin package mounted with such an LED chip or an optics such as a lens system or the like will be referred to as "light emitting diode" or "LED".

The present application is based on Japanese Patent Applications No. 2000-324129 and 2001-091960, which are incorporated herein by reference.

2. Description of the Related Art

Some fluorescent members emitting light in response to irradiation with ultraviolet rays emit light in various different colors. In the background art, as an illumination system using such a fluorescent member, there is a fluorescent lamp emitting white light or daylight color light. The fluorescent lamp is a low-pressure mercury discharge lamp in which a glass tube having electrodes in its opposite ends is coated, on its inner wall, with a fluorescent material emitting light in response to irradiation with ultraviolet rays. Discharge is produced between the opposite electrodes in the state where the pressure of the inside of the glass tube is reduced to a level close to a vacuum. Thus, ultraviolet energy generated by this discharge is converted into light by the fluorescent material. Since bright white light can be obtained stably, such fluorescent lamps have come into wide use in a wide variety of fields such as general household interior illuminations, illuminations for offices, streetlights, etc.

However, in such a background-art fluorescent lamp, the inside of the glass tube coated with the fluorescent material has to be degassed and sealed. In addition, a complicated lighting circuit using a glow starter lamp is required so that the manufacturing process becomes complicated. Further, the end portions of the fluorescent tube deteriorate due to repeated discharge so that the fluorescent lamp becomes difficult to be lit. As a result, the fluorescent lamp lasts for a relatively short period of time so that the fluorescent lamp has to be exchanged into a new one relatively soon. Further, since the glass tube is used, the fluorescent lamp cannot be deformed desirably. Therefore, there is a problem that the fluorescent lamp cannot make a free light expression.

SUMMARY OF THE INVENTION

Therefore, it is an object of the present invention to provide an illumination system which takes the place of a background-art fluorescent lamp, which is manufactured easily, which can entertain a user with light emission in the user's favorite colors, which has a long life, and which can be deformed desirably to thereby make a free light expression.

According to an aspect of the present invention, there is provided a fluorescent tube constituted by: a fluorescent tubular body including a body having a transparent tubular portion, the body having an inner surface and an outer surface, one of the inner and outer surfaces being coated with a fluorescent layer containing a fluorescent material composed of one or more inorganic or organic materials emitting light in response to irradiation with ultraviolet rays; an ultraviolet light emitting diode substrate in which a plurality of ultraviolet light emitting devices inserted in the fluorescent tubular body are disposed on a substrate; a support means for supporting the ultraviolet light emitting diode substrate in the inside of the fluorescent tubular body; and lead wires for supplying electric power to the plurality of ultraviolet light emitting devices.

Here, as the material of "the body having a transparent tubular portion", glass, transparent resin such as acrylic resin, methacrylic resin, polycarbonate resin, or the like, may be used. Further, as the diameter of "the tubular portion", various diameters in a range of from a small diameter of about 5 mm to a large diameter of 10 cm or more may be used. Further, as the shape of "the body having a transparent tubular portion", various shapes such as a straight tube, a curved tube, a circular shape, a spiral shape, a diverging tube, a bottle, a plastic bottle, and so on, may be used. Further, as the sectional shape of the "body having a transparent tubular portion", various sectional shapes such as a circular shape, a semicircular shape, a triangular shape, a quadrangular shape, a polygonal shape having sides more than four sides, a star-like shape, etc. may be used. As the "substrate", not only a rigid substrate such as a glass epoxy substrate but also a flexible substrate such as polyimide film substrate may be used.

In a fluorescent tube having such a configuration, if the plurality of ultraviolet light emitting devices on the ultraviolet LED substrate inserted in the fluorescent tubular body are supplied with electric power through the lead wires, ultraviolet rays are emitted from the plurality of ultraviolet light emitting devices. If the emitted ultraviolet rays strike the fluorescent layer applied onto the fluorescent tubular body, the fluorescent layer emits light in its own fluorescent color. In such a manner, the fluorescent tubular body as a whole emits light and the surroundings are illuminated with the light. Thus, the fluorescent tube can be used for illumination. There are fluorescent materials having various emission colors including light's three primary colors of red, green and blue. In combination of such fluorescent materials, not only white but also an emission color near white can be produced. Further, as illuminations for illuminating, the fluorescent tube can entertain a user with various emission colors other than white.

Such a fluorescent tube can be manufactured very easily by a simple process in which a fluorescent layer is applied onto a body having a transparent tubular portion and an ultraviolet LED substrate is inserted in the body. Accordingly, the process of degassing/sealing or the attachment of a complicated lighting circuit required in a background-art fluorescent lamp is dispensed with. Thus, the fluorescent tube can be manufactured extremely easily. Further, since the ultraviolet light emitting devices are long in life, exchange into new ones can be avoided for a long period of time. Accordingly, unlike a background-art fluorescent lamp, the fluorescent tube can be used semipermanently.

In this manner, an illumination system which takes the place of a background-art fluorescent lamp, which is manufactured easily, which can entertain a user with light emission in the user's favorite colors, and which withstands use for a long time, is realized.

According to another aspect of the present invention, there is provided a fluorescent tube constituted by: a fluorescent tubular body obtained by processing a transparent synthetic resin material into a tubular shape, the synthetic resin material including a fluorescent material composed of one or more inorganic or organic materials emitting light in response to irradiation with ultraviolet rays; an ultraviolet light emitting diode substrate in which a plurality of ultraviolet light emitting devices inserted in the fluorescent tubular body are disposed on a substrate; a support means for supporting the ultraviolet light emitting diode substrate in the inside of the fluorescent tubular body; and lead wires for supplying electric power to the plurality of ultraviolet light emitting devices.

Here, as the "transparent synthetic resin material", transparent resin such as acrylic resin, methacrylic resin, polycarbonate resin, or the like, may be used. As a method for processing the synthetic resin material into a tubular shape, a molding method such as extrusion molding, injection molding, or the like, maybe used. Further, as the diameter of the "fluorescent tubular body", various diameters in a range of from a small diameter of about 5 mm to a large diameter of 10 cm or more may be used. Further, as the sectional shape of the "fluorescent tubular body", various sectional shapes such as a circular shape, a semicircular shape, a triangular shape, a quadrangular shape, a polygonal shape having sides more than four sides, a star-like shape, etc. may be used. As the "substrate", not only a rigid substrate such as a glass epoxy substrate but also a flexible substrate such as polyimide film substrate may be used.

In a fluorescent tube having such a configuration, if the plurality of ultraviolet light emitting devices on the ultraviolet LED substrate inserted in the fluorescent tubular body are supplied with electric power through the lead wires, ultraviolet rays are emitted from the plurality of ultraviolet light emitting devices. If the emitted ultraviolet rays strike the fluorescent material contained in the fluorescent tubular body, the fluorescent material emits light in its own fluorescent color. In such a manner, the fluorescent tubular body as a whole emits light and the surroundings are illuminated with the light. Thus, the fluorescent tube can be used for illumination. There are fluorescent materials having various emission colors including light's three primary colors of red, green and blue. In combination of such fluorescent materials, not only white but also an emission color near white can be produced. Further, as illuminations for illuminating, the fluorescent tube can entertain a user with various emission colors other than white.

Such a fluorescent tube can be manufactured very easily by a simple process in which a transparent synthetic resin material containing a fluorescent material is processed into a tubular shape by extrusion molding or the like, and an ultraviolet. LED substrate is inserted in the tubular shape. Accordingly, the process of degassing/sealing or the attachment of a complicated lighting circuit required in a background-art fluorescent lamp is dispensed with. Thus, the fluorescent tube can be manufactured extremely easily. Further, since the ultraviolet light emitting devices are long in life, exchange into new ones can be avoided for a long period of time. Accordingly, unlike a background-art fluorescent lamp, the fluorescent tube can be used semipermanently.

In this manner, an illumination system which takes the place of a background-art fluorescent lamp, which is manufactured easily, which can entertain a user with light emission in the user's favorite colors, and which withstands use for a long time, is realized.

According to a further aspect of the present invention, in the above configurations of the fluorescent tube, in the ultraviolet light emitting diode substrate, the plurality of ultraviolet light emitting devices are arranged linearly on the substrate. In such a manner, when the plurality of ultraviolet light emitting devices are disposed lineally on the substrate, the ultraviolet rays irradiate the fluorescent tubular body uniformly over the whole length thereof even in the case where the ultraviolet light emitting diode substrate is inserted in a long fluorescent tubular body. Accordingly, the long fluorescent tubular body can be made to emit light uniformly over the whole length thereof.

According to a still further aspect of the present invention, in the above configurations of the fluorescent tube, the support means supports the ultraviolet light emitting diode substrate so that the ultraviolet light emitting diode substrate is located in the vicinity of an inside center of the fluorescent tubular body. In such a manner, because the ultraviolet LED substrate is supported by the support means in the vicinity of the inside center of the fluorescent tubular body, the ultraviolet rays irradiate the fluorescent tubular body uniformly over the whole circumference thereof. Accordingly, the fluorescent tubular body can be made to emit light uniformly over the whole circumference thereof.

According to another aspect of the present invention, in the above configurations of the fluorescent tube, the ultraviolet light emitting diode substrate is constituted by a plurality of ultraviolet light emitting diode unit substrates which are connected to each other, each of the plurality of ultraviolet light emitting diode unit substrates having one or more ultraviolet light emitting devices disposed linearly. Accordingly, it will go well if the ultraviolet LED substrate is configured such that the ultraviolet LED unit substrates are connected to each other in accordance with the length of the fluorescent tubular body. Accordingly, the time and labor for manufacturing exclusive ultraviolet LED substrates to various lengths of the fluorescent tubular bodies correspondingly and separately can be omitted. Thus, the fluorescent tubes can be produced with high productivity.

According to a further aspect of the present invention, in the above configurations of the fluorescent tube, a plurality of the fluorescent tubular bodies are disposed so as to express any one of a character, a numeral, a symbol and a pattern, and the ultraviolet light emitting diode substrate is disposed in each of the plurality of fluorescent tubular bodies, while the ultraviolet light emitting diode substrates are electrically connected to each other. Accordingly, when the ultraviolet light emitting devices on each ultraviolet LED substrate are supplied with electric power through the lead wires, ultraviolet rays are emitted from the ultraviolet light emitting devices so that fluorescence is emitted from each fluorescent tubular body. Then, the fluorescent tubes look luminously and are visually recongnized in the shapes of one or more characters, numerals, symbols, or patterns. Accordingly, the fluorescent tubes can be used not only for interior illuminations but also as a substitute for a neon sign.

According to a further aspect of the present invention, in the configuration of the fluorescent tube, each of the ultraviolet light emitting devices has an emission wavelength in a range of from 360 nm to 400 nm. Accordingly, the central emission wavelength of the ultraviolet light emitting devices becomes 380 nm. In spite of the name of "ultraviolet light emitting devices", the light emitted therefrom is of near ultraviolet rays long in wavelength.

According to still another aspect of the present invention, there is provided an LED fluorescent lamp constituted by: a fluorescent tubular body processed into a tubular shape out of a transparent or semi-transparent deformable synthetic resin material containing a fluorescent material made of one or more inorganic or organic materials emitting light in response to irradiation with ultraviolet rays; a plurality of ultraviolet LED units inserted into the fluorescent tubular body and connected with one another through lead wires flexibly, each of the plurality of ultraviolet LED units being provided with one or more ultraviolet light emitting devices; and the lead wires being led out to an outside of the fluorescent tubular body for supplying electric power to the plurality of ultraviolet LED units.

Here, as the "transparent or semi-transparent deformable synthetic resin material", transparent silicone rubber or the like may be used. Some transparent silicone rubbers are semi-transparent milky-white, in fact. However, light emitted from the fluorescent material contained in such semi-transparent silicone rubbers is so intensive that there is no problem even if the synthetic resin material is semi-transparent. In addition, as a method for processing the synthetic resin material into a tubular shape, a molding method such as extrusion molding, injection molding, or the like, may be used. In addition, as the diameter of the "fluorescent tubular body", various diameters from a small diameter of about 5 mm to a large diameter of 10 cm or larger may be used. Further, as the sectional shape of the "fluorescent tubular body", various sectional shapes such as a circular shape, a semicircular shape, an elliptical shape, a triangular shape, a quadrangular shape, a polygonal shape with sides more than four sides, a star-like shape, and so on, may be used.

In the LED fluorescent lamp configured thus, one or more ultraviolet light emitting devices of each of the plurality of ultraviolet LED units inserted in the fluorescent tubular body are supplied with electric power through the lead wires led out to the outside of the fluorescent tubular body. Thus, ultraviolet rays are emitted from the plurality of ultraviolet light emitting devices. When the emitted ultraviolet rays strike the fluorescent material contained in the fluorescent tubular body, the fluorescent material emits light in its own fluorescent color. Accordingly, the fluorescent tubular body as a whole emits light so that the surroundings are illuminated with the light. Thus, the LED fluorescent lamp can be used for illumination. There are fluorescent materials in various emission colors including light's three primary colors of red, green and blue. In combination of these fluorescent materials, not only white color but also an emission color such as daylight color close to white color can be produced. In addition, the LED fluorescent lamp can also entertain a user with various emission colors other than white color as illuminations for illuminating.

In addition, the fluorescent tubular body is made of a deformable synthetic resin material, and the plurality of ultraviolet LED units inserted in the fluorescent tubular body are connected with one another flexibly through the lead wires. Accordingly, the fluorescent tubular body can be bent into any desired shape so as to be attached easily in the desired shape for illumination. In addition, a character, a symbol, or the like, can be drawn by one or more LED fluorescent lamps, and a character string or the like can be formed by a plurality of LED fluorescent lamps. Accordingly, the LED fluorescent lamps can be used as a substitute for a neon sign.

Such an LED fluorescent lamp can be manufactured as follows. That is, a plurality of ultraviolet LED units connected with one another flexibly through lead wires are merely inserted in a fluorescent tubular body processed into a tubular shape out of a transparent or semi-transparent deformable synthetic resin material containing a fluorescent material by extrusion molding or the like. Therefore, the process of degassing/sealing or the attachment of a complicated lighting circuit required in a background-art fluorescent lamp is dispensed with. Thus, the LED fluorescent lamp can be manufactured extremely easily. In addition, since no mercury is used, there is no problem in environmental pollution. Further, the lives of the ultraviolet light emitting devices are so long that exchange into new ones is not required for a long period of time. Thus, the LED fluorescent lamp can be used for a long period of time 10 or more times as long as a background-art fluorescent lamp.

In such a manner, an illumination system which takes the place of a background-art fluorescent lamp, which is manufactured easily, which can entertain a user with light emission in the user's favorite colors, which has a long life, and which can be deformed desirably to thereby make a free light expression, is realized.

According to still another aspect of the present invention, there is provided an LED fluorescent lamp constituted by: a double fluorescent tubular body processed into a tubular shape out of a transparent or semi-transparent deformable synthetic resin material containing no fluorescent material, and a transparent or semi-transparent deformable synthetic resin material containing a fluorescent material made of one or more inorganic or organic materials emitting light in response to irradiation with ultraviolet rays, the synthetic resin material containing the fluorescent material being disposed on an outer or inner side of the synthetic resin material containing no fluorescent material; a plurality of ultraviolet LED units inserted into the double fluorescent tubular body and connected with one another through lead wires flexibly, each of the plurality of ultraviolet LED units being provided with one or more ultraviolet light emitting devices; and the lead wires being led out to an outside of the double fluorescent tubular body for supplying electric power to the plurality of ultraviolet LED units.

Here, as the "transparent or semi-transparent deformable synthetic resin material", transparent silicone rubber or the like may be used. Some transparent silicone rubbers are semi-transparent milky-white, in fact. However, light emitted from the fluorescent material contained in such semi-transparent silicone rubbers is so intensive that there is no problem even if the synthetic resin material is semi-transparent. In addition, as a method for processing the synthetic resin material into a tubular shape, a molding method such as extrusion molding, injection molding, or the like, may be used. In addition, as the diameter of the "double fluorescent tubular body", various diameters from a small diameter of about 5 mm to a large diameter of 10 cm or larger may be used. Further, as the sectional shape of the "double fluorescent tubular body", various sectional shapes such as a circular shape, a semicircular shape, an elliptical shape, a triangular shape, a quadrangular shape, a polygonal shape with sides more than four sides, a star-like shape, and so on, may be used.

In the LED fluorescent lamp configured thus, one or more ultraviolet light emitting devices of each of the plurality of ultraviolet LED units inserted in the double fluorescent tubular body are supplied with electric power through the lead wires which are led out to the outside of the double fluorescent tubular body. Thus, ultraviolet rays are emitted from the plurality of ultraviolet light emitting devices. When the emitted ultraviolet rays strike the layer of the double fluorescent tubular body containing the fluorescent material, the fluorescent material emits light in its own fluorescent color. Accordingly, the double fluorescent tubular body as a whole emits light so that the surroundings are illuminated with the light. Thus, the LED fluorescent lamp can be used for illumination. There are fluorescent materials in various emission colors including light's three primary colors of red, green and blue. In combination of these fluorescent materials, not only white color but also an emission color such as daylight color close to white color or the like can be produced. In addition, the LED fluorescent lamp can also entertain a user with various emission colors other than white color as illuminations for illuminating.

Here, in the LED fluorescent lamp according to the present invention, the fluorescent tubular body has a double structure of a layer containing a fluorescent material and a layer containing no fluorescent material. Therefore, when the fluorescent tubular body is made as thick as that of the LED fluorescent lamp as described above, the layer containing the fluorescent material becomes thin. Thus, the quantity of the fluorescent material used can be reduced so that the cost of the LED fluorescent lamp can be reduced. In addition, when the layer containing the fluorescent material is disposed in the outer side, ultraviolet rays emitted from the ultraviolet light emitting devices pass through the layer containing no fluorescent material, and then strike the layer containing the fluorescent material so as to emit fluorescence from the layer containing the fluorescent material. On the contrary, when the layer containing the fluorescent material is disposed in the inner side, ultraviolet rays emitted from the ultraviolet light emitting devices strike the layer containing the fluorescent material so as to emit fluorescence from the layer containing the fluorescent material. Then, the emitted fluorescence is irradiated to the outside through the layer containing no fluorescent material.

In addition, the double fluorescent tubular body is made of a deformable synthetic resin material, and the plurality of ultraviolet LED units inserted in the double fluorescent tubular body are connected with one another flexibly through the lead wires. Accordingly, the double fluorescent tubular body can be bent into any desired shape so as to be attached easily in the desired shape for illumination. In addition, a character, a symbol, or the like, can be drawn by one or more LED fluorescent lamps, and a character string or the like can be formed by a plurality of LED fluorescent lamps. Accordingly, the LED fluorescent lamps can be used as a substitute for a neon sign.

Such an LED fluorescent lamp can be manufactured as follows. That is, a plurality of ultraviolet LED units connected with one another flexibly through lead wires are merely inserted in a double fluorescent tubular body processed into a tubular shape out of a transparent or semi-transparent deformable synthetic resin material containing a fluorescent material and a transparent or semi-transparent deformable synthetic resin material containing no fluorescent material by extrusion molding or the like, while the synthetic resin material containing the fluorescent material is disposed on the outer or inner side of the synthetic resin material containing no fluorescent material. Therefore, the process of degassing/sealing or the attachment of a complicated lighting circuit required in a background-art fluorescent lamp is dispensed with. Thus, the LED fluorescent lamp can be manufactured extremely easily. In addition, since no mercury is used, there is no problem in environmental pollution. Further, the lives of the ultraviolet light emitting devices are so long that exchange into new ones is not required for a long period of time. Thus, the LED fluorescent lamp can be used for a long period of time 10 or more times as long as a background-art fluorescent lamp.

In such a manner, an illumination system which takes the place of a background-art fluorescent lamp, which is manufactured easily, which can entertain a user with light emission in the user's favorite colors, which has a long life and can be reduced in cost, and which can be deformed desirably to thereby make a free light expression, is realized.

According to a further aspect of the present invention, there is provided an LED fluorescent lamp constituted by: a tubular body formed out of a transparent or semi-transparent deformable synthetic resin material processed into a tubular shape; a fluorescent layer containing a fluorescent material made of one or more inorganic or organic materials emitting light in response to irradiation with ultraviolet rays, the fluorescent layer being applied to an outer surface or an inner surface of the tubular body; a plurality of ultraviolet LED units inserted into the tubular body and connected with one another through lead wires flexibly, each of the plurality of ultraviolet LED units being provided with one or more ultraviolet light emitting devices; and the lead wires being led out to an outside of the tubular body for supplying electric power to the plurality of ultraviolet LED units.

Here, as the "transparent or semi-transparent deformable synthetic resin material", transparent silicone rubber or the like may be used. Some transparent silicone rubbers are semi-transparent milky-white, in fact. However, light emitted from the fluorescent material contained in the fluorescent layer is so intensive that there is no problem even if the synthetic resin material is semi-transparent. In addition, as a method for processing the synthetic resin material into a tubular shape, a molding method such as extrusion molding, injection molding, or the like, may be used. In addition, as the diameter of the "tubular body", various diameters from a small diameter of about 5 mm to a large diameter of 10 cm or larger may be used. Further, as the sectional shape of the "tubular body", various sectional shapes such as a circular shape, a semicircular shape, an elliptical shape, a triangular shape, a quadrangular shape, a polygonal shape with sides more than four sides, a star-like shape, and so on, may be used.

In the LED fluorescent lamp configured thus, one or more ultraviolet light emitting devices of each of the plurality of ultraviolet LED units inserted in the tubular body are supplied with electric power through the lead wires which are led out to the outside of the tubular body. Thus, ultraviolet rays are emitted from the plurality of ultraviolet light emitting devices. When the emitted ultraviolet rays strike the fluorescent layer containing the fluorescent material applied to the inner surface or the outer surface of the tubular body, the fluorescent material emits light in its own fluorescent color. Accordingly, the tubular body as a whole emits light so that the surroundings are illuminated with the light. Thus, the LED fluorescent lamp can be used for illumination. There are fluorescent materials in various emission colors including light's three primary colors of red, green and blue. In combination of these fluorescent materials, not only white color but also an emission color such as daylight color close to white color or the like can be produced. In addition, the LED fluorescent lamp can also entertain a user with various emission colors other than white color as illuminations for illuminating.

In addition, the tubular body is made of a deformable synthetic resin material, and the plurality of ultraviolet LED units inserted in the tubular body are connected with one another flexibly through the lead wires. Accordingly, the tubular body can be bent into any desired shape so as to be attached easily in the desired shape for illumination. In addition, a character, a symbol, or the like, can be drawn by one or more LED fluorescent lamps, and a character string or the like can be formed by a plurality of LED fluorescent lamps. Accordingly, the LED fluorescent lamps can be used as a substitute for a neon sign.

Such an LED fluorescent lamp can be manufactured as follows. That is, a plurality of ultraviolet LED units connected with one another flexibly through lead wires are merely inserted in a tubular body which is processed into a tubular shape out of a transparent or semi-transparent deformable synthetic resin material by extrusion molding or the like while the outer surface or the inner surface of the tubular body is coated with a fluorescent layer containing a fluorescent material. Therefore, the process of degassing/ sealing or the attachment of a complicated lighting circuit required in a background-art fluorescent lamp is dispensed with. Thus, the LED fluorescent lamp can be manufactured extremely easily. In addition, since no mercury is used, there is no problem in environmental pollution. Further, the lives of the ultraviolet light emitting devices are so long that exchange into new ones is not required for a long period of time. Thus, the LED fluorescent lamp can be used for a long period of time 10 or more times as long as a background-art fluorescent lamp.

In such a manner, an illumination system which takes the place of a background-art fluorescent lamp, which is manufactured easily, which can entertain a user with light emission in the user's favorite colors, which has a long life, and which can be deformed desirably to thereby make a free light expression, is realized.

According to a still further aspect of the present invention, in the above configurations of the LED fluorescent lamp, in each of the ultraviolet LED units, the one or more ultraviolet light emitting devices are disposed on a substrate.

Here, a glass epoxy substrate or the like may be used as the "substrate".

In the LED fluorescent lamp configured thus, because one or more ultraviolet light emitting devices are disposed on the substrate, attachment of the ultraviolet light emitting devices is easy and wiring can be performed easily by use of printed wiring. Accordingly, reduction in cost can be realized.

In such a manner, an illumination system which takes the place of a background-art fluorescent lamp, which is manufactured more easily and more inexpensive, which can entertain a user with light emission in a variety of the user's favorite colors, which has a long life, and which can be deformed desirably to thereby make a free light expression, is realized.

According to another aspect of the present invention, in the above configurations of the LED fluorescent lamp, synthetic resin material is transparent silicone rubber.

The transparent silicone rubber is excellent in mixing property with the fluorescent material, superior in transmission of ultraviolet rays or visible light rays, and easy to be processed into a tubular shape by extrusion molding. In addition, the transparent silicone rubber is rich in flexibility so as to be deformed easily, while the flexibility does not deteriorate due to ultraviolet rays. Thus, the transparent silicone rubber is suitable as the synthetic resin material for the LED fluorescent lamp. The transparent silicone rubber may be mixed with a fluorescent material before being processed into a tubular shape. Alternatively, the transparent silicone rubber may be processed into a tubular shape before being coated with a fluorescent layer containing a fluorescent material. Thus, a user can be entertained with light emission in the user's favorite color by use of ultraviolet rays of the plurality of ultraviolet light emitting devices inserted in the tubular shape.

In such a manner, an illumination system which takes the place of a background-art fluorescent lamp, which is manufactured easily, which can entertain a user with light emission in a variety of the user's favorite colors, which has a long life, and which can be deformed desirably to thereby make a free light expression, is realized.

According to a further aspect of the present invention, in the above configurations of the LED fluorescent lamp, the fluorescent material is composed of a red fluorescent material emitting light in red in response to irradiation with ultraviolet rays, a green fluorescent material emitting light in green in response to irradiation with ultraviolet rays, and a blue fluorescent material emitting light in blue in response to irradiation with ultraviolet rays.

In such a manner, when the fluorescent materials emitting light in three colors of red, green and blue which are light's three primary colors are compounded as the fluorescent material used in the LED fluorescent lamp, not only is light emitted in white color or daylight color in the same manner as that in a background-art fluorescent lamp, but also light can be emitted in reddish white, greenish white or bluish white by changing the compounding ratio. Further, yellow can be made by mixing red and green, cyan can be made by mixing green and blue, and pink can be made by mixing red and blue. Thus, by compounding the fluorescent materials emitting light in light's three primary colors, light can be emitted in any color so that a user can be entertained with a rich variation of colors.

In such a manner, an illumination system which takes the place of a background-art fluorescent lamp, which is manufactured easily, which can entertain a user with light emission in a rich variety of the user's favorite colors, which has a long life, and which can be deformed desirably to thereby make a free light expression, is realized.

According to a still further aspect of the present invention, in the above configurations of the LED fluorescent lamp, each of the ultraviolet light emitting devices has a peak wavelength of light emitted therefrom in a range of from 360 nm to 400 nm.

Accordingly, the central emission wavelength of the ultraviolet light emitting devices becomes 380 nm. In spite of the name of "ultraviolet light emitting devices", the light emitted therefrom is of near ultraviolet rays long in wavelength. In addition, all the peak wavelengths of respective excitation spectra of the fluorescent materials emitting light in the three colors of red, green and blue which are light's three primary colors are in a range of from 360 nm to 400 nm. Fluorescence can be therefore emitted extremely efficiently. When the fluorescent materials emitting light in the three colors of red, green and blue are used, the LED fluorescent lamp becomes very bright.

Thus, the LED fluorescent lamp has no influence on health even if the ultraviolet light emitting devices are lit for a long time for illumination, while the LED fluorescent lamp can obtain very bright light emission.

To sum up, a fluorescent tube according to the present invention has a fluorescent tubular body and at least one light emitting diode substrate inserted in the fluorescent tubular body. The fluorescent tubular body is provided with a fluorescent member containing a fluorescent material. The light emitting diode substrate has a plurality of ultraviolet light emitting devices which are disposed on a substrate. Ultraviolet rays are emitted from the plurality of ultraviolet light emitting devices, and if the emitted ultraviolet rays strike the fluorescent member of the fluorescent tubular body, the fluorescent member emits light in its own fluorescent color. In such a manner, the fluorescent tubular body as a whole emits light and the surroundings are illuminated with the light. Thus, the fluorescent tube can be used for illumination.

Features and advantages of the invention will be evident from the following detailed description of the preferred embodiments described in conjunction with the attached drawings.

BRIEF DESCRIPTION OF THE DRAWINGS

In the accompanying drawings:

FIG. 1 is a perspective view showing the whole configuration of a fluorescent tube according to Embodiment 1 of the present invention;

FIG. 5A is a broken perspective view showing the whole configuration of an LED fluorescent lamp according to Embodiment 3 of the present invention, and FIG. 5B is a longitudinally sectional view showing the partially enlarged LED fluorescent lamp;

FIG. 6A is a plan view showing the whole configuration of an ultraviolet LED substrate used for the LED fluorescent lamp according to Embodiment 3 of the present invention, FIG. 6B is a front view, and FIG. 6C is a circuit view of the LED fluorescent lamp as a whole;

DETAILED DESCRIPTION OF THE PREFERRED EMBODIMENTS

Hereunder, embodiments of the present invention will be described.

Embodiment 1

Figure 2A:
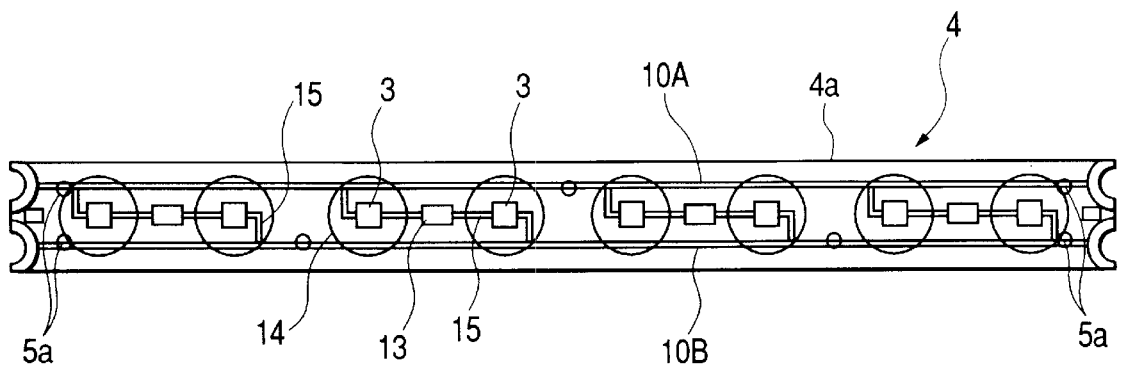
FIG. 2A is a plan view showing the whole configuration of an ultraviolet LED unit substrate to be used in the fluorescent tube according to Embodiment 1 of the present invention.
Figure 2B:
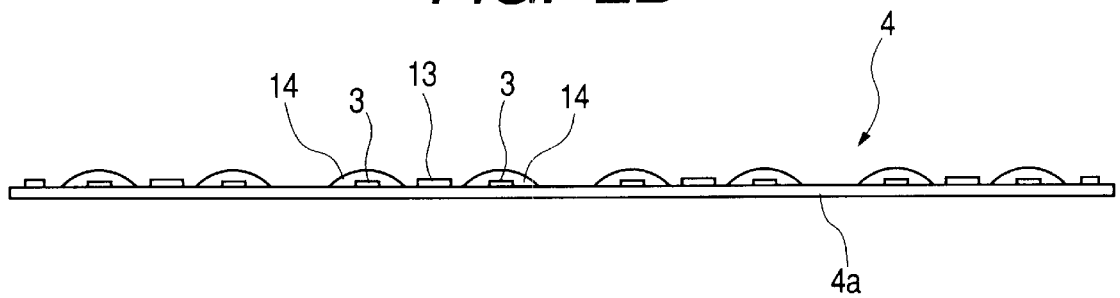
FIG. 2B is a front view.
Figure 2C:
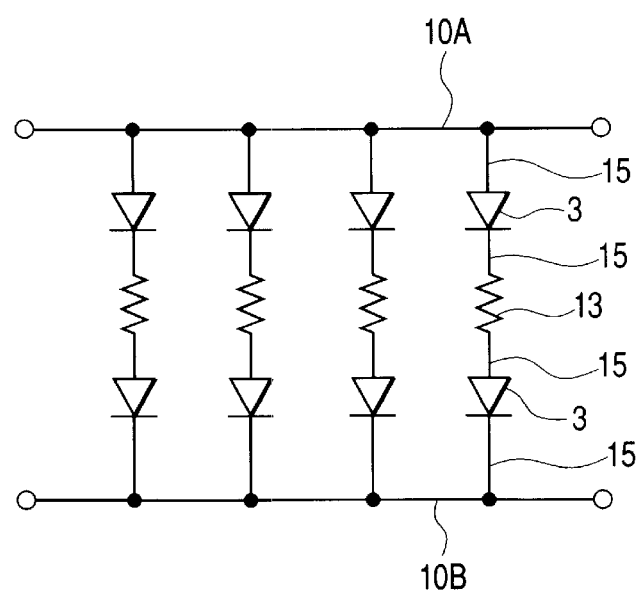
FIG. 2C is an inside circuit diagram.
Figure 3A:
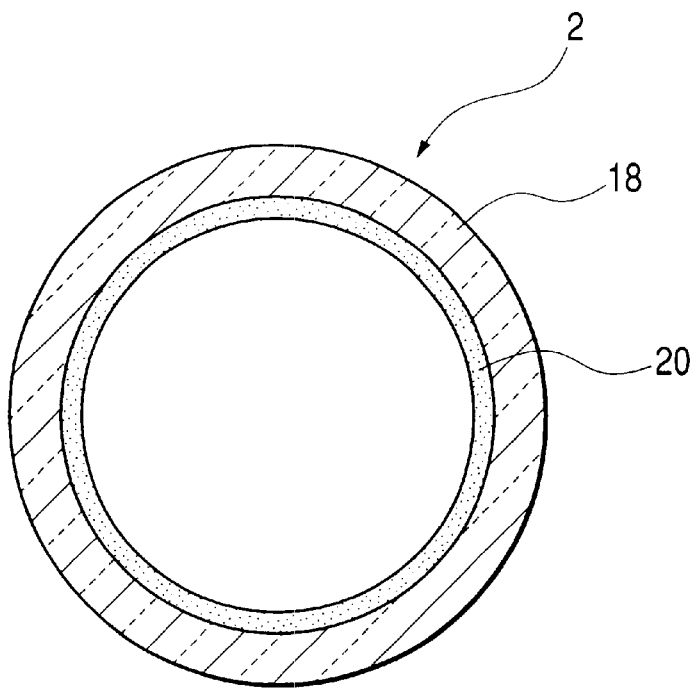
FIG. 3A is a sectional view showing the configuration of a fluorescent tubular body of the fluorescent tube according to Embodiment 1 of the present invention.
Figure 3B:
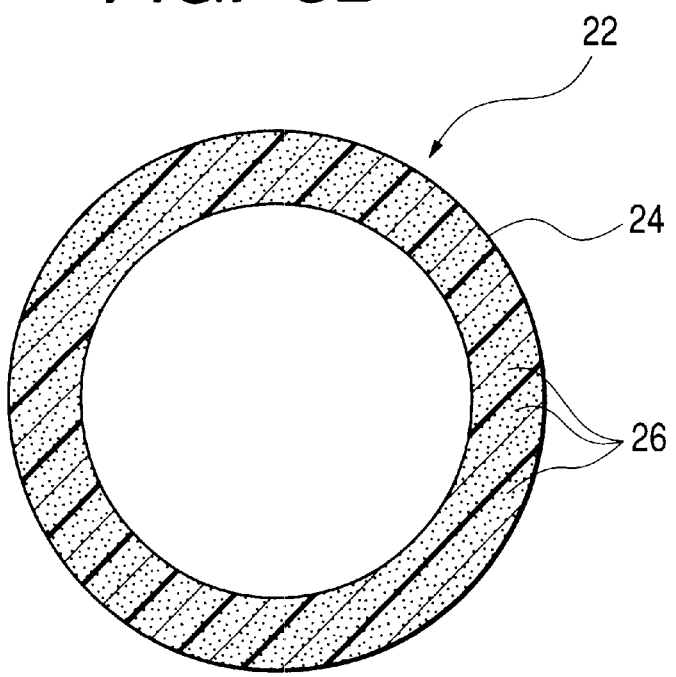
FIG. 3B is a sectional view showing the configuration of a fluorescent tubular body of a fluorescent tube according to a modification of Embodiment 1 of the present invention.

FIG. 1 is a perspective view showing the whole configuration of a fluorescent tube according to Embodiment 1 of the present invention. FIG. 2A is a plan view showing the whole configuration of an ultraviolet LED unit substrate to be used in the fluorescent tube according to Embodiment 1 of the present invention, FIG. 2B is a front view, and FIG. 2C is an inside circuit diagram. FIG. 3A is a sectional view showing the configuration of a fluorescent tubular body of the fluorescent tube according to Embodiment 1 of the present invention, and FIG. 3B is a sectional view showing the configuration of a fluorescent tubular body of a fluorescent tube according to a modification of Embodiment 1 of the present invention.

First, with reference to FIG. 1, FIGS. 2A to 2C, and FIGS. 3A and 3B, Embodiment 1 of the present invention will be described. As shown in FIG. 1, the fluorescent tube 1 in the Embodiment 1 is configured such that a fluorescent layer (fluorescent member) containing a fluorescent material is applied to the inner surface of a transparent glass tube to thereby obtain a fluorescent tubular body 2 and an ultraviolet LED substrate 5 substantially equal in length to the fluorescent tubular body 2 is inserted in the fluorescent tubular body 2. Incidentally, the fluorescent tubular body 2 with its inner surface coated with the fluorescent layer is, in fact, opaque. However, in order to facilitate understanding of the inside structure of the fluorescent tube 1, the inside thereof is also shown in FIG. 1 as if the fluorescent tubular body 2 is transparent.

The ultraviolet LED substrate 5 is constituted by three ultraviolet LED unit substrates 4 connected with each other. That is, the ultraviolet LED unit substrates 4 are mechanically and electrically connected to each other by soldering 9. Eight ultraviolet light emitting devices (hereinafter simply referred to as "light emitting device") 3 are linearly disposed on each ultraviolet LED unit substrate 4, and hence the ultraviolet LED substrate 5 has twenty-four ultraviolet light emitting devices 3 in total.

The light emitting device 3 may be formed of various kinds of semiconductors. An example of the semiconductor is nitride semiconductor. Especially, AlGaInN semiconductor, AlGaN semiconductor, GaN semiconductor, InGaN semiconductor or the like may be employed.

The ultraviolet LED substrate 5 is tension-supported by support holes 7a formed in the protrusions 7 protruded into the inside of Teflon plugs 6 (cover) which are fitted as supporting means in the opposite ends of the fluorescent tubular body 2. That is, each of the opposite ends of the ultraviolet LED substrate 5 is provided with two through-holes 5a. Insulation supporting cords 8 are made to penetrate the through-holes 5a on the opposite ends and to penetrate the supporting holes 7a, and then the supporting cords 8 are tied. In such a manner, the ultraviolet LED substrate 5 is tied to the supporting holes 7a of the Teflon plugs 6 at the opposite ends of the ultraviolet LED substrate 5 so that the ultraviolet LED substrate 5 is supported to be located in the vicinity of the center of the cross section of the fluorescent tubular body 2.

Further, two lead wires 11A and 11B for supplying electric power to the twenty-four light emitting devices 3 are connected, by soldering, to the left end of the ultraviolet LED substrate 5. The lead wires 11A and 11B are connected respectively to printed wirings 10A and 10B printed on the ultraviolet LED substrate 5. The printed wiring 10A is on the positive (+) pole side and the printed wiring 10B is on the minus (−) pole side. Accordingly, penetrating the left Teflon plug 6, the lead wire 11A is connected to the (+) pole side of an external power source 12, and the lead wire 11B is connected to the (−) pole side of the power source 12.

Next, with reference to FIGS. 2A to 2C, the configuration of the ultraviolet LED unit substrate 4 according to the Embodiment 1 will be described in more detail. As shown in FIG. 2A, every two of the eight light emitting devices 3 on the ultraviolet LED unit substrate 4 are wired in pair with a resistor 13 sandwiched between the pair of light emitting devices 3. One terminal of the left light emitting device 3 is connected to the (+) pole-side printed wiring 10A through a printed wiring 15 and, on the opposite side, the other terminal of this left light emitting device 3 is connected to one terminal of the resistor 13 through the printed wiring 15. The other terminal of the resistor 13 on the opposite side is connected through the printed wiring 15 to the left terminal of the right light emitting device 3. The right terminal of the right light emitting device 3 on the opposite side is connected through the printed wiring 15 to the (−) pole-side printed wiring 10B.

Four sets of such circuits are arranged on the glass epoxy substrate 4a. Further, as shown in FIG. 2B, the eight light emitting devices 3 are sealed by transparent epoxy resin 14. In such a manner, the light emitting devices 3 are prevented from being deteriorated, and the light quantity of ultraviolet rays to be radiated increases.

FIG. 2C shows the circuit diagram of the configuration of the ultraviolet LED unit substrate 4 described above. As shown FIG. 2C, four sets of circuits each constituted by the light emitting devices 3 and the resistor 13 are connected in parallel with each other between the (+) side printed wiring 10A and the (−) side printed wiring 10B.

The emission wavelength of each ultraviolet light emitting device 3 according to the Embodiment 1 is in a range of from 360 nm to 400 nm and the peak of the light output intensity is 380 nm at the intermediate wavelength. The pattern of the light output intensity is symmetrical about 380 nm. Accordingly, in spite of the name of "ultraviolet light emitting device", the light emitted therefrom is of near ultraviolet rays long in wavelength. Incidentally, light emitted from the ultraviolet light emitting device 3 according to the present invention has to include at least near ultraviolet rays having a long wavelength, and it does not matter whether visible light is emitted or not.

With reference to FIGS. 3A and 3B, the structure of the fluorescent tubular body 2 according to the Embodiment 1, and a modification thereof are described below. As shown in FIG. 3A, the fluorescent tubular body 2 according to the Embodiment 1 is obtained by applying the fluorescent layer 20 including a fluorescent material onto the inner wall of a transparent cylindrical glass tube 18. As the method of application of the fluorescent layer 20, when the fluorescent layer 20 is applied to a tubular body (pipe) having a large diameter, the fluorescent layer 20 formed into a liquid state may be sprayed with an air spray and then dried. However, as shown in the Embodiment 1, in the case where the glass tube 18 has no such large diameter, one end of the glass tube 18 is immersed in the liquid fluorescent layer 20 while the inside of the glass tube 18 is decompressed by a vacuum pump from the other end. Thus, the fluorescent layer 20 adheres to the inner wall of the glass tube 18 so that the fluorescent layer 20 is applied as shown in FIG. 3A.

Incidentally, in the Embodiment 1, though the fluorescent layer 20 is applied to the inner surface of the glass tube 18, the fluorescent layer 20 may be applied onto the outer circumferential surface of the glass tube 18 (configuration similar to FIG. 7A hereinafter described) In this case, even the diameter of the glass tube is small, the application can be made by spraying by use of an air spray.

Further, as a method other than the method of direct application, there maybe used a method in which a fluorescent layer is applied to a synthetic resin film or sheet and then dried so that the film or sheet is inserted to the inner surface of a transparent pipe. In the case where a film or sheet is coated with a fluorescent layer thus, different kinds of fluorescent layers may be used to form a stripe pattern, or to draw various kinds of patterns, or to draw a pattern such as a painting by silk-screen printing.

As the modification of the fluorescent tubular body 2 according to the Embodiment 1, there may be used a fluorescent tubular body such as the fluorescent tubular body 22 shown in FIG. 3B. The fluorescent tubular body 22 is extrusion-molded out of a thermoplastic transparent synthetic resin material 24 containing a fluorescent material 26, and formed into a cylindrical pipe shape. In the fluorescent tubular body 22 formed thus, there is an advantage that the process of applying the fluorescent layer to the fluorescent tubular body 22 can be omitted and the fluorescent material 26 is dispersed uniformly in the fluorescent tubular body 2.

In the fluorescent tube 1 of the Embodiment 1 configured thus, when a not-shown switch of the power supply 12 is turned on, the twenty-four ultraviolet light emitting devices 3 on the ultraviolet LED substrate 5 which is inserted in the fluorescent tubular body 2 are supplied with electric power through the lead wires 11A and 11B, so that ultraviolet rays are emitted from the twenty-four ultraviolet light emitting devices 3. Because the ultraviolet LED substrate 5 is supported to be located in the vicinity of the inside center of the fluorescent tubular body 2 by the support means, the whole circumference of the fluorescent tubular body 2 is irradiated with the ultraviolet rays uniformly. When the irradiated ultraviolet rays strike the fluorescent layer 20 applied to the inner surface of the fluorescent tubular body 2, the fluorescent layer 20 emits light in its own fluorescent color. Hence, the fluorescent tubular body 2 as a whole emits light and the surroundings are illuminated with the light, so that the fluorescent tube 1 can be used for illumination.

There are fluorescent materials in various emission colors including light's three primary colors of red, green and blue. Here, a specific example of a red fluorescent material emitting light in red in response to irradiation with near ultraviolet rays may be a fluorescent member of lanthanum sulfide activated with trivalent europium and trivalent samarium, which is substantially expressed by a general formula $(La_{1-x-y}Eu_xSm_y)_2O_2S$ (in the formula, x and y designate numbers, respectively, satisfying $0.01 \leq x \leq 0.15$ and $0.0001 \leq y \leq 0.03$).

Further, a specific example of a green fluorescent material emitting light in green in response to irradiation with near ultraviolet rays may be a fluorescent member of aluminate activated with bivalent europium and bivalent manganese, which is substantially expressed by a general formula $a(M1,Eu,Mn)O \cdot bAl_2O_3$ (in the formula, M1 designates at least one element selected from the group of Mg, Ca, Sr, Ba, Zn, Li, Rb, and Cs, and a and b designate numbers, respectively, satisfying $a>0$, $b>0$, and $0.2 \leq a/b \leq 1.5$).

Further, a specific example of a blue fluorescent material emitting light in blue in response to irradiation with near ultraviolet rays may be a fluorescent member of holophosphate activated with bivalent europium, which is substantially expressed by a general formula $(M2,Eu)_{10}(PO_4)_6 \cdot Cl_2$ (in the formula, M2 designates at least one element selected from the group of Mg, Ca, Sr, and Ba) and a fluorescent member of aluminate activated with bivalent europium, which is substantially expressed by a general formula $a(M1,Eu)O \cdot bAl_2O_3$ (in the formula, M1 designates at least one element selected from the group of Mg, Ca, Sr, Ba, Zn, Li, Rb, and Cs, and a and b designate numbers, respectively, satisfying $a>0$, $b>0$, and $0.2 \leq a/b \leq 1.5$).

Thus, an emission color close to white, including white, can be produced in the combination of the above-mentioned kinds of fluorescent materials. In addition, a user can be also entertained with various emission colors other than white by using the fluorescent tube as illuminations for illuminating.

Such a fluorescent tube 1 can be produced by simply inserting an ultraviolet LED substrate 5 in a body 18 which has a transparent tubular portion and the inner surface of which is coated with a fluorescent layer 20. Therefore, the process of degassing/sealing or the attachment of a complicated lighting circuit required in the background-art fluorescent lamp is dispensed with. Thus, the fluorescent tube 1 can be manufactured extremely easily. Further, the lives of the light emitting devices 3 are so long that exchange into new ones can be avoided for a long period of time. Thus, unlike the background-art fluorescent lamp, the fluorescent tube 1 can be used semipermanently. Thus, the fluorescent tube 1 takes the place of the background-art LED fluorescent lamp, and realizes an illumination system which can be manufactured easily, by which a user can entertained with light emission not only in white but also in the user's favorite color and which can withstand use for a long period of time.

Embodiment 2

Figure 4:
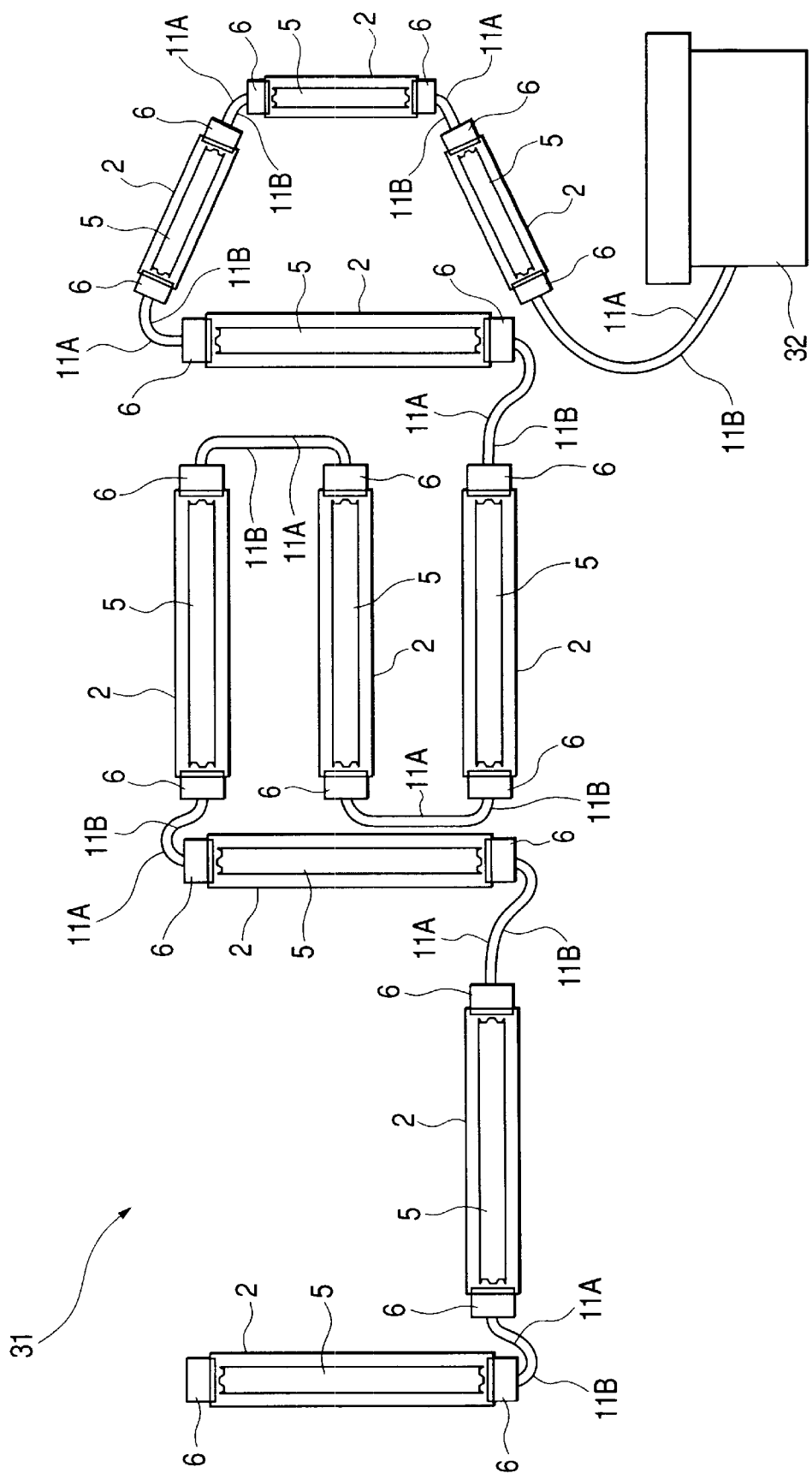
FIG. 4 is an explanatory view showing the whole configuration of a fluorescent tube using a plurality of fluorescent tubular bodies according to Embodiment 2 of the present invention.

With reference to FIG. 4, Embodiment 2 of the present invention will be described below. FIG. 4 is an explanatory view showing the whole configuration of a fluorescent tube using a plurality of fluorescent tubular bodies according to Embodiment 2 of the present invention. As shown in FIG. 4, in the fluorescent tube 31 in the Embodiment 2, there are disposed a plurality of (ten) fluorescent tubular bodies 2 so as to display three alphabetical characters of "L", "E" and "D". In the inside of each of the ten fluorescent tubular bodies 2, an ultraviolet LED substrate 5 is disposed with electrical connection with lead wires 11A and 11B. Incidentally, each of the fluorescent tubular bodies 2 is, in fact, opaque, because the inside of the fluorescent tubular body 2 is coated with a fluorescent layer 20. However, in order to facilitate description, the ultraviolet LED substrates 5 inside the fluorescent tubular bodies 2 are shown visibly in FIG. 4 as if the fluorescent tubular bodies 2 are transparent.

First, on the left side, character "L" is formed by two fluorescent tubular bodies 2 having equal lengths. In the same manner as that in Embodiment 1, as the structure of each fluorescent tubular body, an ultraviolet LED substrate 5 inside a fluorescent tubular body 2 is supported by Teflon plugs 6 fitted at opposite ends of the fluorescent tubular body 2, and lead wires 11A and 11B soldered at one of the opposite end portions of the ultraviolet LED substrate 5 penetrate one of the Teflon plugs 6, so that the lead wires 11A and 11B are led out to the outside. Next, in the center, character "E" is formed by four fluorescent tubular bodies 2 having equal lengths. These four fluorescent tubular bodies are also electrically connected sequentially with each other by lead wires 11A and 11B. On the right side, character "D" is drawn by one fluorescent tubular body 2 having an equal length to each of the above-mentioned fluorescent tubular bodies and three fluorescent tubular bodies 2 having shorter lengths than the fluorescent tubular body 2 having the equal length. The lead wires 11A and 11B led out from the fluorescent tubular body 2 in the right lower part are connected to the power supply 32.

Incidentally, because the ultraviolet light emitting devices 3 on the ultraviolet LED substrate 5 are connected in parallel as shown in FIG. 2C, the voltage applied to the ultraviolet light emitting devices 3 hardly changes no matter how long the line of the fluorescent tubular bodies 2 is. Accordingly, emission with the same brightness can be obtained from each of the fluorescent tubular body 2.

The ten fluorescent tubular bodies 2 in total are bonded to a not-shown glass plate by a glass adhesive agent. The not-shown glass plate is further supported fixedly and perpendicularly by a not-shown wooden substrate. Accordingly, by the ten fluorescent tubular bodies 2 in total, three alphabetical characters "L", "E" and "D" are formed in the air. As a method for supporting the ten fluorescent tubular bodies 2, other than the above-mentioned method, various methods such as a method for fastening the fluorescent tubular bodies 2 to a wooden plate with a wire, a method for fastening the fluorescent tubular bodies 2 to a netted support frame with a cord, or the like, may be used.

In the fluorescent tube 31 constituted by a plurality of fluorescent tubular bodies 2 in such a configuration, when a not-shown switch of the power supply 32 is turned on, the ultraviolet light emitting devices 3 on each ultraviolet LED substrate 5 are supplied with electric power through the lead wires 11A and 11B, so that ultraviolet rays are emitted from the ultraviolet light emitting devices 3. As a result, fluorescent emits from each fluorescent tubular body 2. Then, the shapes of the three characters "L", "E" and "D" are illuminated with the light and visually recognized. Accordingly, not to say, the fluorescent tube 31 can be used for interior illuminations. Further, the fluorescent tube 31 can be used also as a substitute for a neon sign. Incidentally, in the case where the fluorescent tube 31 is used as an outdoor advertisement such as a neon sign or the like, the length and the diameter of each fluorescent tubular body 2 have to be made larger. Further, when the fluorescent tube 31 is used as illuminations or as a neon sign, in addition to simple lighting, the fluorescent tube 31 is required to have a device such as blinking, lighting made sequentially from an end, lighting made partially different in time slot, or the like. Further, as for the color, preferably, several kinds of fluorescent materials are used to produce several kinds of emission colors instead of one color.

To various applications other than the above description, the fluorescent tube in each of the embodiments can be also applied. For example, in illumination, the fluorescent tube can be used for interior illumination. Further, for a substitute for the in-car lamp of an automobile, the fluorescent tube can be used as a light source on the outer circumference of the car, for example, as a brake lamp or the like. Further, a fluorescent tube using fluorescent tubular bodies each of which is obtained by extrusion-molding a material prepared by dispersing a fluorescent material with a red emission color into transparent synthetic resin can be used as a road safety article such as a nightstick, a stick, or the like. The nightstick can be used for traffic control in a construction site or the like, and the stick can be used when an aged person goes out at night. Further, a plurality of small-sized multicolor fluorescent tubes can be applied to display of a graphic equalizer of an audio apparatus or any other display device. Further, a fluorescent tube having a white emission color can be also applied as a light source of backlight of the LCD (liquid crystal display).

Although the glass tube 18 is used as the body having a transparent tubular portion in each of the embodiments, transparent resin such as acrylic resin, methacrylic resin, polycarbonate resin, or the like, may be used. Further, although description has been made about the case where a straight tube is used as a shape of the body having the tubular portion, various shapes such as a curbed tube, a circular shape, a spiral shape, a diverging shape, a bottle, a plastic bottle, and the like, may be used. In addition, although a circular shape is used as the sectional shape of the body having the tubular portion, various sectional shapes such a semicircular shape, an elliptical shape, a triangular shape, a quadrangular shape, a polygonal shape with sides more than four sides, a star-like shape, or the like, may be used.

Further, although the glass epoxy substrate 4a has been used as a substrate, not only such a rigid substrate but also a flexible substrate such as a polyimide film substrate may be used. Accordingly, when a character or the like is expressed by a fluorescent tube, the fluorescent tube maybe configured such that a curved fluorescent tubular body in the curved portion of the character or the like is used so that a flexible substrate mounted with ultraviolet light emitting devices is bent and inserted in the fluorescent tubular body. In such a manner, a shape such as the character or the like can be expressed more naturally and the number of the fluorescent tubular bodies for forming the character or the like can be reduced.

In addition, although ultraviolet light emitting devices with an emission wavelength ranging from 360 nm to 400 nm are used as the ultraviolet light emitting devices, ones having a wavelength in any range may be used if the wavelength is in the range of ultraviolet rays allowing the fluorescent material to emit light. The structure, shape, numeral, material, size, connection relation, and so on, of the other parts of the fluorescent tube are not limited to those in these embodiments.

Embodiment 3

Next, Embodiment 3 of the present invention will be described.

Figure 7A:
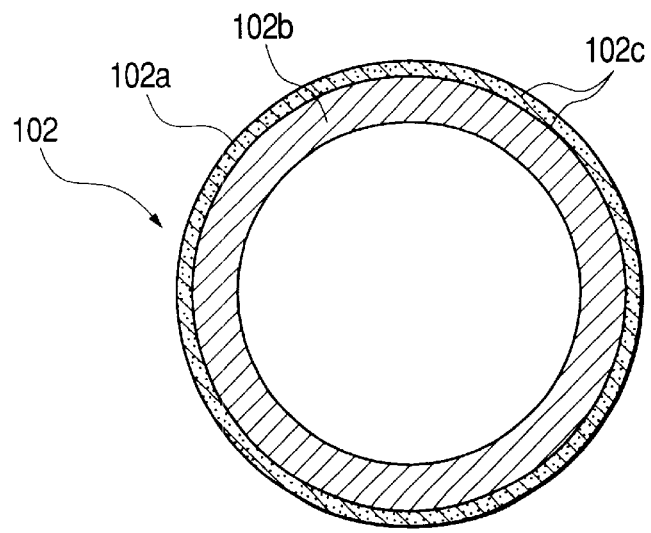
FIG. 7A is a sectional view showing the configuration of a fluorescent tubular body of the LED fluorescent lamp according to Embodiment 3 of the present invention.
Figure 7B:
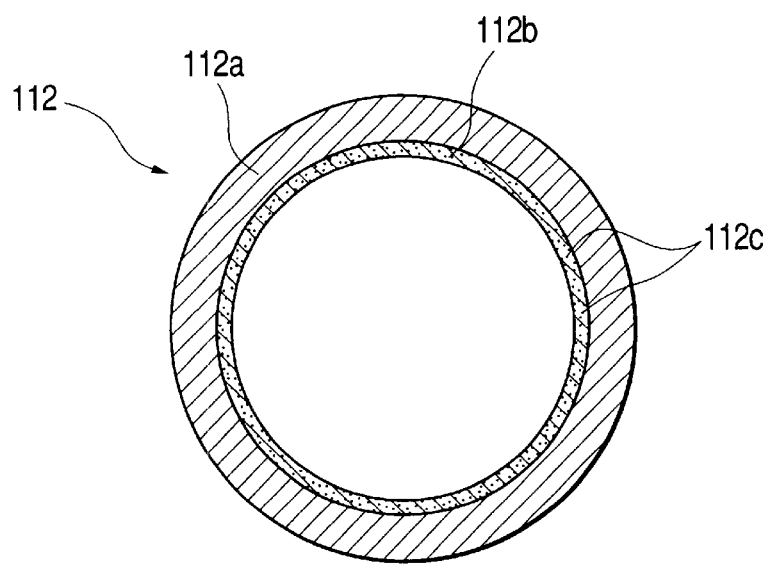
FIGS. 7B and 7C are sectional views showing the configurations of fluorescent tubular bodies of LED fluorescent lamps according to modifications of Embodiment 3 of the present invention.
Figure 8A:
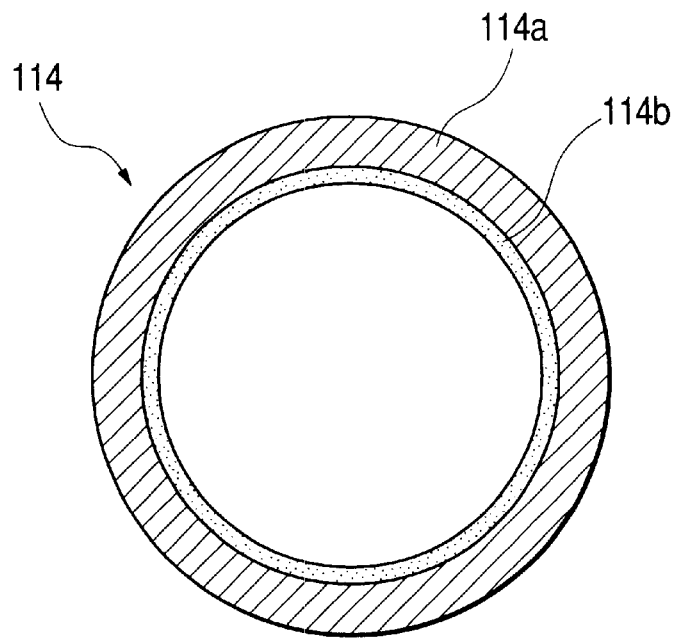
FIGS. 8A and 8B are sectional views showing the configurations of fluorescent tubular bodies of LED fluorescent lamps according to modifications of Embodiment 3 of the present invention.
Figure 8B:
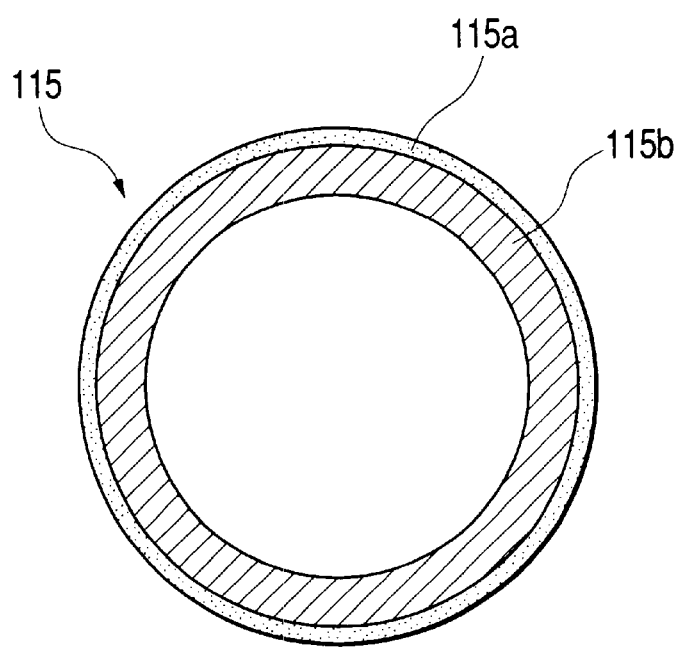
Figure 9:
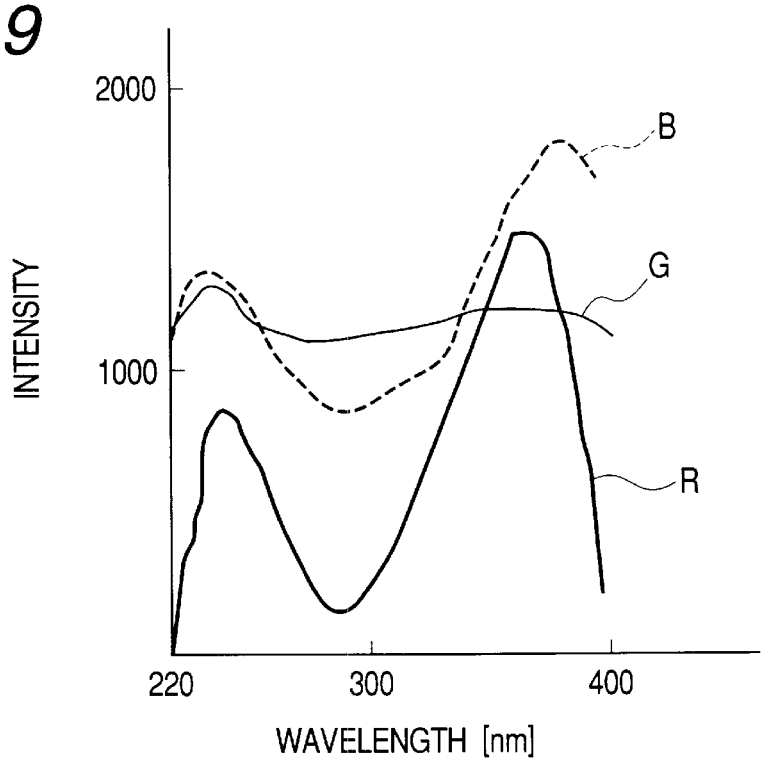
FIG. 9 is a graph showing excitation spectra of fluorescent materials used in the LED fluorescent lamp according to Embodiment 3 of the present invention.
Figure 10:
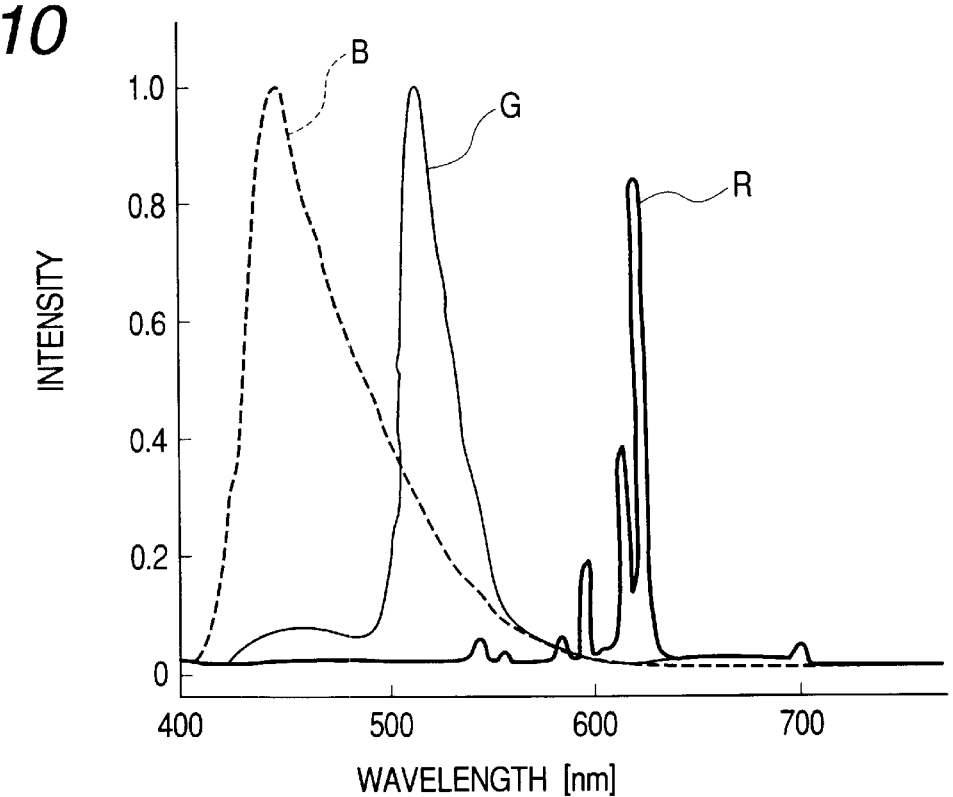
FIG. 10 is a graph showing emission spectra of the fluorescent materials used in the LED fluorescent lamp according to the Embodiment 3 of the present invention.

FIG. 5A is a broken perspective view showing the whole configuration of an LED fluorescent lamp (fluorescent tube) according to Embodiment 3 of the present invention, and FIG. 5B is a longitudinally sectional view showing the partially enlarged LED fluorescent lamp. FIG. 6A is a plan view showing the whole configuration of an ultraviolet LED substrate used in the LED fluorescent lamp according to Embodiment 3 of the present invention, FIG. 6B is a front view, and FIG. 6C is a circuit view of the LED fluorescent lamp as a whole. FIG. 7A is a sectional view showing the configuration of a fluorescent tubular body of the LED fluorescent lamp according to Embodiment 3, and FIGS. 7B and 3C are sectional views showing the configurations of fluorescent tubular bodies of LED fluorescent lamps according to modifications of Embodiment 3. FIGS. 8A and 8B are sectional views showing the configurations of fluorescent tubular bodies of LED fluorescent lamps according to modifications of Embodiment 3. FIG. 9 is a graph showing excitation spectra of fluorescent materials used in the LED fluorescent lamp according to Embodiment 3. FIG. 10 is a graph showing emission spectra of the fluorescent materials used in the LED fluorescent lamp according to Embodiment 3.

As shown in FIG. 5A, in an LED fluorescent lamp 101 according to Embodiment 3, a transparent silicone rubber 102a containing a fluorescent material is disposed on the outer side of a transparent silicone rubber 102b serving as a transparent or semi-transparent deformable synthetic resin material. The transparent silicone rubber 102b with the transparent silicone rubber 102a is formed into a tubular shape by extrusion molding so as to form a double fluorescent tubular body 102. Eight ultraviolet LED substrates 103 as ultraviolet LED units are connected with one another by pairs of lead wires 107A and 107B, and inserted into the double fluorescent tubular body 102 so as to be substantially as long as the double fluorescent tubular body 102. Incidentally, after extrusion molding, the transparent silicone rubbers 102a and 102b are heated at 200° C. for 10 minutes so as to be vulcanized into rubbers rich in flexibility. A pair of lead wires 109A and 109B are connected to each of opposite ends of the eight ultraviolet LED substrates 103 so as to penetrate a Teflon cover 108 fitted to corresponding one of the opposite ends of the double fluorescent tubular body 102. Thus, the lead wires 109A and 109B are led out to the outside.

In each of the ultraviolet LED substrates 103, two ultraviolet light emitting devices (hereinafter also referred to as "light emitting devices" simply) 104 and a resistor 105 are disposed on a glass epoxy substrate on which printed wirings 106A, 106B and so on formed out of copper foil have been printed. Thus, the LED fluorescent lamp 101 has sixteen ultraviolet light emitting devices 104 in total. When a voltage (12 V in Embodiment 3) is applied from an external power supply to the ultraviolet light emitting devices 104 through one pair of lead wires 109A and 109B, ultraviolet rays are emitted from the ultraviolet light emitting devices 104 as shown in FIG. 5B. The transparent silicone rubber 102a containing a fluorescent material is irradiated with the ultraviolet rays. As a result, the fluorescent material is excited to emit fluorescence in its own color. For example, when the fluorescent material is a mixture of three kinds of fluorescent materials respectively emitting fluorescence in red, green and blue which are light's three primary colors, white light is emitted in the same manner as that in a background-art fluorescent lamp. Otherwise, the LED fluorescent lamp 101 can emit fluorescence in various colors including red, green and blue in accordance with the selected fluorescent materials.

As aforementioned, the light emitting device 104 may be formed of nitride semiconductor. Especially, AlGaInN semiconductor, AlGaN semiconductor, GaN semiconductor, InGaN semiconductor or the like may be employed.

Then, the double fluorescent tubular body 102 is made of the transparent silicone rubbers 102a and 102b rich in flexibility while the eight ultraviolet LED substrates 103 inserted into the double fluorescent tubular body 102 are connected with one another through the pairs of lead wires 107A and 107B flexibly. Thus, the LED fluorescent lamp 101 can be bent into a desirable shape. In addition, the life of each fluorescent light emitting device 104 is so long that the LED fluorescent lamp 101 can be lit for a long period of time 110 or more times as long as a background-art fluorescent lamp. Further, the process of degassing/sealing or the attachment of a complicated lighting circuit required in a background-art fluorescent lamp is dispensed with in the LED fluorescent lamp 101. Thus, the LED fluorescent lamp 101 can be manufactured extremely easily.

In such a manner, the LED fluorescent lamp 101 in Embodiment 3 is realized as an illumination system which takes the place of a background-art fluorescent lamp, which is manufactured easily, which can entertain a user with light emission in a rich variety of the user's favorite colors, which has a long life, and which can be deformed desirably to thereby make a free light expression.

Next, detailed description will be made about the configuration of the ultraviolet LED substrate 103 in Embodiment 3 with reference to FIGS. 6A to 6C. As shown in FIG. 6A, the two light emitting devices 104 on the ultraviolet LED substrate 103 are wired with each other by printed wiring 110 with the resistor 105 sandwiched between the two light emitting devices 104. One terminal of the left light emitting device 104 is connected to the (+) pole side printed wiring 106A through the printed wiring 110. The other terminal of this left light emitting device 104 on the opposite side is connected to one terminal of the resistor 105 through the printed wiring 110. The other terminal of the resistor 105 on the opposite side is connected to the left terminal of the right light emitting device 104 through the printed wiring 110. The right terminal of this right light emitting device 104 is connected to the (−) pole side printed wiring 106B through the printed wiring 110.

As shown in FIG. 6B, such a circuit is arranged on the glass epoxy substrate 103a. Further, the two light emitting devices 104 are sealed by transparent epoxy resin 111. Thus, the light emitting devices 104 are prevented from being deteriorated while the light quantity of ultraviolet rays emitted from each light emitting device 104 increases (generally, the emission light quantity of a light emitting device with resin sealing becomes about twice as large as that without any resin sealing).

FIG. 6C is a circuit diagram showing the configuration of the LED fluorescent lamp 101 in which eight ultraviolet LED substrates 103 as described above have been connected with one another through pairs of lead wires 107A and 107B respectively. As shown in FIG. 6C, the (+) pole side printed wiring 106A and the (−) pole side printed wiring 106B are connected in lines through lead wires 107A and 107B respectively. Thus, two light emitting devices 104 and one resistor 105 constituting each ultraviolet LED substrate 103 are connected in parallel between the printed wiring 6A and the printed wiring 106B. As a result, a voltage (12 V in this Embodiment 3) required for making the LED fluorescent lamp 101 emit light hardly changes even if the double fluorescent tubular body 102 is made longer and the number of the ultraviolet LED substrates 103 is increased. Thus, the double fluorescent tubular body 102 can be formed to have a desired length. For example, when the double fluorescent tubular body 102 is set to be 1 m long, the required number of ultraviolet LED substrates 103 becomes about 30.

The peak emission wavelength of the ultraviolet light emitting devices 104 in Embodiment 3 ranges from 360 nm to 400 nm. The peak of the light output intensity is 380 nm at the intermediate wavelength, and the pattern of the light output intensity is symmetrical about 380 nm. Accordingly, in spite of the name of "ultraviolet light emitting device", the light emitted therefrom is of near ultraviolet rays which is long in wavelength. Incidentally, as for the ultraviolet light emitting devices 104 according to the present invention, emitted light may include at least near ultraviolet rays having a long wavelength. It does not matter whether visible light is emitted or not.

Next, description will be made about the structure of the double fluorescent tubular body 102 in this Embodiment 3 and its modifications with reference to FIGS. 7A and 7C and FIGS. 8A and 8B. As shown in FIG. 7A, in the double fluorescent tubular body 102 in Embodiment 3, a thin and cylindrical transparent silicone rubber 102a containing a fluorescent material 102c has been disposed on the outer side of a cylindrical transparent silicone rubber 102b which serves as a transparent or semi-transparent deformable synthetic resin material. As described previously, fluorescence is generated by ultraviolet rays emitted from the ultraviolet LED substrates 103 which are inserted in the double fluorescent tubular body 102. The fluorescent is irradiated directly to the outside. Therefore, there is no fear that this structure attenuates visible light (fluorescence). Thus, the LED fluorescent lamp 101 has high luminance.

FIGS. 7B and 7C and FIGS. 8A and 8B show structures of modifications of fluorescent tubular bodies. FIG. 7B shows the sectional shape of a double fluorescent tubular body 112 in which a thin and cylindrical transparent silicone rubber 112b containing a fluorescent material 112c has been disposed on the inner side of a cylindrical transparent silicone rubber 112a. In this structure, fluorescence is generated by ultraviolet rays emitted from the ultraviolet LED substrates 103 which are inserted in the double fluorescent tubular body 112. The fluorescent is irradiated to the outside through the transparent silicone rubber 112a. Some transparent silicone rubbers are semi-transparent milky-white.

Figure 7C:
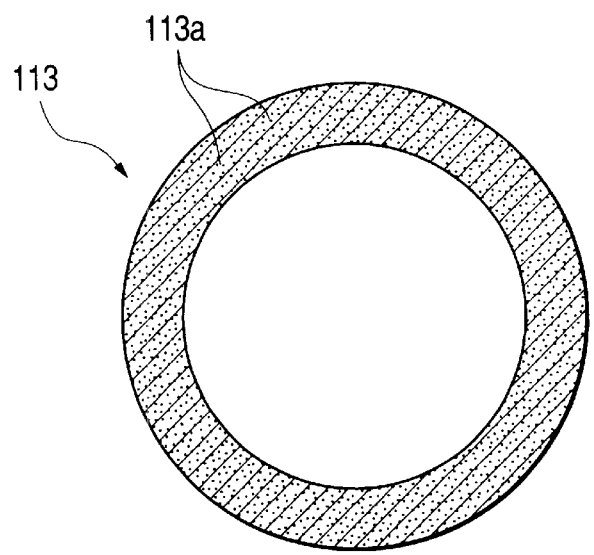

FIG. 7C shows a double fluorescent tubular body in which a fluorescent material 113a has been dispersed in the whole of a cylindrical transparent silicone rubber 113. Since the quantity of the fluorescent material 113a increases, more intensive fluorescent emission can be obtained.

FIG. 8A shows the sectional shape of a fluorescent tubular body 114 in which a fluorescent layer 114b containing a fluorescent material has been applied to the inner surface of a cylindrical transparent silicone rubber 114a. As a method for application of the fluorescent layer 114b, the fluorescent layer 114b formed into a liquid state may be sprayed with an air spray and then dried so as to be applied to the tubular body 114a having such a large diameter. However, when the tubular body 114a does not have a large diameter, one end of the tubular body 114a is immersed in the fluorescent layer 114b formed into a liquid state while the pressure in the tubular body 114a is reduced from the other end by a vacuum pump. Thus, the fluorescent layer 114b adheres to the inner wall of the tubular body 114a so as to be applied as shown in FIG. 8A.

FIG. 8B shows the sectional shape of a fluorescent tubular body 115 in which a fluorescent layer 115a containing a fluorescent material has been applied to the outer surface of a cylindrical transparent silicone rubber 115b. In this case, even if the tubular body 115b has a small diameter, the fluorescent layer 115a can be applied by spraying with an air spray.

Fluorescent materials available for the LED fluorescent lamp 101 in Embodiment 3 have various emission colors including light's three primary colors of red, green and blue. Here, a specific example of a red fluorescent material R emitting red light in response to irradiation with near ultraviolet rays may be a fluorescent member of lanthanum sulfide activated with europium and samarium, which is expressed by the chemical formula $La_2O_2S:Sm,Eu$.

In addition, a specific example of a green fluorescent material G emitting green light in response to irradiation with near ultraviolet rays may be a fluorescent member of barium magnesium aluminate activated with europium and manganese, which is expressed by the chemical formula $BaMgAl_{10}O_{17}:Eu,Mn$.

Further, a specific example of a blue fluorescent material B emitting blue light in response to irradiation with near ultraviolet rays may be a fluorescent member of chlorostrontium phosphate activated with europium, which is expressed by the chemical formula $(Sr,Ca,Ba)_{10}(PO_4)_6 \cdot Cl_2:Eu$.

Thus, an emission color close to white, including white, can be produced in the combination of these fluorescent materials. In addition, a user can be also entertained with various emission colors other than white for illumination.

Next, description will be made about excitation spectra and emission spectra of the red fluorescent material R, the green fluorescent material G and the blue fluorescent material B with reference to FIGS. 9 and 10.

As shown in FIG. 9, the excitation peak wavelength of the red fluorescent material R is 370 nm, and the excitation peak wavelength of the blue fluorescent material B is 385 nm. On the other hand, the excitation peak wavelength of the green fluorescent material G is in a far ultraviolet range. However, also in the vicinity of 360 nm, the green fluorescent material G shows excitation intensity no less than the excitation peak. As described previously, the peak emission wavelength of the ultraviolet light emitting devices 104 used in the LED fluorescent lamp 101 in this Embodiment 3 ranges from 360 nm to 400 nm. In this wavelength range, each of the red fluorescent material R, the green fluorescent material G and the blue fluorescent material B shows high excitation intensity. Fluorescence can be therefore emitted extremely efficiently. Thus, when the fluorescent materials emitting light in the three colors of red, green and blue are used, the LED fluorescent lamp becomes very bright.

In addition, as shown in FIG. 10, the emission spectrum of each of the red fluorescent material R, the green fluorescent material G and the blue fluorescent material B has a broad waveform. Thus, it is understood that the light there of is soft light peculiar to a fluorescent member. Accordingly, also when a single-color LED fluorescent lamp is used for illumination or as a substitute for a neon sign as described above, it can be used as soft light. Incidentally, when the LED fluorescent lamp is used for illumination or as a neon sign, in addition to simple lighting, the LED fluorescent lamp is required to have a device such as blinking, lighting made sequentially from an end, lighting made partially different in time slot, or the like. Further, as for the color, preferably, several kinds of fluorescent materials are used to produce several kinds of emission colors in stead of one single color.

The compounding ratio of the respective fluorescent materials in the transparent silicone rubber 102*a* containing a fluorescent material forming the double fluorescent tubular body 102 of the LED fluorescent lamp 101 in Embodiment 3 is as follows. That is, 30 weight parts of the red fluorescent material R, 10 weight parts of the green fluorescent material G, and 10 weight parts of the blue fluorescent material B are compounded per 100 weight parts of transparent silicone rubber. Since the luminance of the red fluorescent material R is lower than those of the other two colors, beautiful white light emission can be obtained in this compounding ratio. In addition, when the fluorescent material in each color is used to form a single-color LED fluorescent lamp, as the compounding ratios to 100 weight parts of the transparent silicone rubber, the red fluorescent material R is 20 weight parts, the green fluorescent material G is 30 weight parts, and the blue fluorescent material B is 30 weight parts, respectively.

The LED fluorescent lamp 101 may be also used for a wide variety of other applications. For example, for illuminating, it may be used not only as interior illumination but also as a substitute for an interior lamp of a car or as a circumferential light source of a car such as a brake lamp. Further, a plurality of small-size and multi-color LED fluorescent lamps can be applied to a display for a graphic equalizer of an audio apparatus, or other displays. Further, an LED fluorescent lamp with a white emission color can be also applied to a backlight source for an LCD (Liquid Crystal Display).

Although the transparent silicone rubbers 102*a* and 102*b* are used for transparent or semi-transparent deformable synthetic resin materials in Embodiment 3, other synthetic resin materials may be used. In addition, although a circular shape is used as the sectional shape of the fluorescent tubular body, various sectional shapes such a semicircular shape, an elliptical shape, a triangular shape, a quadrangular shape, a polygonal shape with sides more than four sides, a star-like shape, and so on, may be used.

Further, although the glass epoxy substrate 103*a* is used as a substrate, not only such a rigid substrate but also a flexible substrate such as a polyimide film substrate maybe used. In addition, a socket mounted with ultraviolet light emitting devices may be connected directly to lead wires without using any substrate. Thus, the flexibility of the LED fluorescent lamp is more improved so that the LED fluorescent lamp can be bent into a more desired shape.

In addition, although ultraviolet light emitting devices with peak emission wavelength ranging from 360 nm to 400 nm are used, ultraviolet light emitting devices having a wavelength in any range may be used if the wavelength is in the range of ultraviolet rays allowing the fluorescent material to emit light. The structure, shape, number, material, size, connection relation, and soon, of the other parts of the LED fluorescent lamp are not limited to those in Embodiment 3.

Incidentally, although Embodiment 3 was described about a transparent or semi-transparent deformable synthetic resin material containing a fluorescent material made of one or more inorganic or organic luminescent materials, an LED fluorescent lamp may be also formed out of a deformable synthetic resin material containing no fluorescent material or out of an undeformable synthetic resin material.

Further, each element or feature explained in the above all embodiments can be combined freely with the possible extent.

As described above, according to an aspect of the present invention, there is provided a fluorescent tube constituted by: a fluorescent tubular body including a body having a transparent tubular portion, the body having an inner surface and an outer surface, one of the inner and outer surfaces being coated with a fluorescent layer containing a fluorescent material composed of one or more inorganic or organic materials emitting light in response to irradiation with ultraviolet rays; an ultraviolet light emitting diode substrate in which a plurality of ultraviolet light emitting devices inserted in the fluorescent tubular body are disposed on a substrate; a support means for supporting the ultraviolet light emitting diode substrate in the inside of the fluorescent tubular body; and lead wires for supplying electric power to the plurality of ultraviolet light emitting devices.

In a fluorescent tube having such a configuration, if the plurality of ultraviolet light emitting devices on the ultraviolet LED substrate inserted in the fluorescent tubular body are supplied with electric power through the lead wires, ultraviolet rays are emitted from the plurality of ultraviolet light emitting devices. If the emitted ultraviolet rays strike the fluorescent layer applied onto the fluorescent tubular body, the fluorescent layer emits light in its own fluorescent color. In such a manner, the fluorescent tubular body as a whole emits light and the surroundings are illuminated with the light. Thus, the fluorescent tube can be used for illumination. There are fluorescent materials having various emission colors including light's three primary colors of red, green and blue. In combination of such fluorescent materials, not only white but also an emission color near white can be produced. Further, as illuminations for illuminating, the fluorescent tube can entertain a user with various emission colors other than white.

Such a fluorescent tube can be manufactured very easily by a simple process in which a fluorescent layer is applied onto a body having a transparent tubular portion and an ultraviolet LED substrate is inserted in the body. Accordingly, the process of degassing/sealing or the attachment of a complicated lighting circuit required in a background-art fluorescent lamp is dispensed with. Thus, the fluorescent tube can be manufactured extremely easily. Further, since the ultraviolet light emitting devices are long in life, exchange into new ones can be avoided for a long period of time. Accordingly, unlike a background-art fluorescent lamp, the fluorescent tube can be used semipermanently. In this manner, an illumination system which takes the place of a background-art fluorescent lamp, which is manufactured easily, which can entertain a user with light emission in the user's favorite colors, and which withstands use for a long time, is realized.

According to another aspect of the present invention, there is provided a fluorescent tube constituted by: a fluorescent tubular body obtained by processing a transparent synthetic resin material into a tubular shape, the synthetic resin material including a fluorescent material composed of one or more inorganic or organic materials emitting light in response to irradiation with ultraviolet rays; an ultraviolet light emitting diode substrate in which a plurality of ultraviolet light emitting devices inserted in the fluorescent tubular body are disposed on a substrate; a support means for supporting the ultraviolet light emitting diode substrate in the inside of the fluorescent tubular body; and lead wires for supplying electric power to the plurality of ultraviolet light emitting devices.

In a fluorescent tube having such a configuration, if the plurality of ultraviolet light emitting devices on the ultraviolet LED substrate inserted in the fluorescent tubular body are supplied with electric power through the lead wires, ultraviolet rays are emitted from the plurality of ultraviolet light emitting devices. If the emitted ultraviolet rays strike the fluorescent material contained in the fluorescent tubular body, the fluorescent material emits light in its own fluorescent color. In such a manner, the fluorescent tubular body as a whole emits light and the surroundings are illuminated with the light. Thus, the fluorescent tube can be used for illumination. There are fluorescent materials having various emission colors including light's three primary colors of red, green and blue. In combination of such fluorescent materials, not only white but also an emission color near white can be produced. Further, as illuminations for illuminating, the fluorescent tube can entertain a user with various emission colors other than white.

Such a fluorescent tube can be manufactured very easily by a simple process in which a transparent synthetic resin material containing a fluorescent material is processed into a tubular shape by extrusion molding or the like, and an ultraviolet LED substrate is inserted in the tubular shape. Accordingly, the process of degassing/sealing or the attachment of a complicated lighting circuit required in a background-art fluorescent lamp is dispensed with. Thus, the fluorescent tube can be manufactured extremely easily. Further, since the ultraviolet light emitting devices are long in life, exchange into new ones can be avoided for a long period of time. Accordingly, unlike a background-art fluorescent lamp, the fluorescent tube can be used semipermanently. In this manner, an illumination system which takes the place of a background-art fluorescent lamp, which is manufactured easily, which can entertain a user with light emission in the user's favorite colors, and which withstands use for a long time, is realized.

According to a further aspect of the present invention, in the above configurations of the fluorescent tube, in the ultraviolet light emitting diode substrate, the plurality of ultraviolet light emitting devices are arranged linearly on the substrate. In such a manner, when the plurality of ultraviolet light emitting devices are disposed lineally on the substrate, the ultraviolet rays irradiate the fluorescent tubular body uniformly over the whole length thereof even in the case where the ultraviolet light emitting diode substrate is inserted in a long fluorescent tubular body. Accordingly, the long fluorescent tubular body can be made to emit light uniformly over the whole length thereof.

According to a still further aspect of the present invention, in the above configurations of the fluorescent tube, the support means supports the ultraviolet light emitting diode substrate so that the ultraviolet light emitting diode substrate is located in the vicinity of an inside center of the fluorescent tubular body. In such a manner, because the ultraviolet LED substrate is supported by the support means in the vicinity of the inside center of the fluorescent tubular body, the ultraviolet rays irradiate the fluorescent tubular body uniformly over the whole circumference thereof. Accordingly, the fluorescent tubular body can be made to emit light uniformly over the whole circumference thereof.

According to another aspect of the present invention, in the above configurations of the fluorescent tube, the ultraviolet light emitting diode substrate is constituted by a plurality of ultraviolet light emitting diode unit substrates which are connected to each other, each of the plurality of ultraviolet light emitting diode unit substrates having one or more ultraviolet light emitting devices disposed linearly. Accordingly, it will go well if the ultraviolet LED substrate is formed by the ultraviolet LED unit substrates connected to each other in accordance with the length of the fluorescent tubular body. Accordingly, the time and labor for manufacturing exclusive ultraviolet LED substrates to various lengths of the fluorescent tubular bodies correspondingly and separately can be omitted. Thus, the fluorescent tubes can be produced with high productivity.

According to a further aspect of the present invention, in the above configurations of the fluorescent tube, a plurality of the fluorescent tubular bodies are disposed so as to express any one of a character, a numeral, a symbol and a pattern, and the ultraviolet light emitting diode substrate is disposed in each of the plurality of fluorescent tubular bodies, while the ultraviolet light emitting diode substrates are electrically connected to each other. Accordingly, when the ultraviolet light emitting devices on each ultraviolet LED substrate are supplied with electric power through the lead wires, ultraviolet rays are emitted from the ultraviolet light emitting devices so that fluorescence is emitted from each fluorescent tubular body. Then, the fluorescent tubes look luminously and are visually recongnized in the shapes of one or more characters, numerals, symbols, or patterns. Accordingly, the fluorescent tubes can be used not only for interior illuminations but also as a substitute for a neon sign.

According to a further aspect of the present invention, in the above configurations of the fluorescent tube, each of the ultraviolet light emitting devices has an emission wavelength in a range of from 360 nm to 400 nm. Accordingly, the central emission wavelength of the ultraviolet light emitting devices becomes 380 nm. In spite of the name of "ultraviolet light emitting devices", the light emitted therefrom is of near ultraviolet rays long in wavelength.

According to still another aspect of the present invention, there is provided an LED fluorescent lamp constituted by: a fluorescent tubular body processed into a tubular shape out of a transparent or semi-transparent deformable synthetic resin material containing a fluorescent material made of one or more inorganic or organic materials emitting light in response to irradiation with ultraviolet rays; a plurality of ultraviolet LED units inserted into the fluorescent tubular body and connected with one another through lead wires flexibly, each of the plurality of ultraviolet LED units being provided with one or more ultraviolet light emitting devices; and the lead wires being led out to an outside of the fluorescent tubular body for supplying electric power to the plurality of ultraviolet LED units.

In the LED fluorescent lamp configured thus, one or more ultraviolet light emitting devices of each of the plurality of ultraviolet LED units inserted in the fluorescent tubular body are supplied with electric power through the lead wires which are led out to the outside of the fluorescent tubular body. Thus, ultraviolet rays are emitted from the plurality of ultraviolet light emitting devices. When the emitted ultraviolet rays strike the fluorescent material contained in the fluorescent tubular body, the fluorescent material emits light in its own fluorescent color. Accordingly, the fluorescent tubular body as a whole emits light so that the surroundings are illuminated with the light. Thus, the LED fluorescent lamp can be used for illumination. There are fluorescent materials in various emission colors including light's three primary colors of red, green and blue. In combination of these fluorescent materials, not only white color but also an emission color such as daylight color close to white color or the like can be produced. In addition, the LED fluorescent lamp can also entertain a user with various emission colors other than white color as illuminations for illuminating.

In addition, the fluorescent tubular body is made of a deformable synthetic resin material, and the plurality of ultraviolet LED units inserted in the fluorescent tubular body are connected with one another flexibly through the lead wires. Accordingly, the fluorescent tubular body can be bent into any desired shape so as to be attached easily in the desired shape for illumination. In addition, a character, a symbol, or the like, can be drawn by one or more LED fluorescent lamps, and a character string or the like can be formed by a plurality of LED fluorescent lamps. Accordingly, the LED fluorescent lamps can be used as a substitute for a neon sign.

Such an LED fluorescent lamp can be manufactured as follows. That is, a plurality of ultraviolet LED units connected with one another flexibly through lead wires are merely inserted in a fluorescent tubular body processed into a tubular shape out of a transparent or semi-transparent deformable synthetic resin material containing a fluorescent material by extrusion molding or the like. Therefore, the process of degassing/sealing or the attachment of a complicated lighting circuit required in a background-art fluorescent lamp is dispensed with. Thus, the LED fluorescent lamp can be manufactured extremely easily. In addition, since no mercury is used, there is no problem in environmental pollution. Further, the lives of the ultraviolet light emitting devices are so long that exchange into new ones is not required for a long period of time. Thus, the LED fluorescent lamp can be used for a long period of time 10 or more times as long as a background-art fluorescent lamp.

In such a manner, an illumination system which takes the place of a background-art fluorescent lamp, which is manufactured easily, which can entertain a user with light emission in the user's favorite colors, which has a long life, and which can be deformed desirably to thereby make a free light expression, is realized.

According to another aspect of the present invention, there is provided an LED fluorescent lamp constituted by: a double fluorescent tubular body processed into a tubular shape out of a transparent or semi-transparent deformable synthetic resin material containing no fluorescent material, and a transparent or semi-transparent deformable synthetic resin material containing a fluorescent material made of one or more inorganic or organic materials emitting light in response to irradiation with ultraviolet rays, the synthetic resin material containing the fluorescent material being disposed on an outer or inner side of the synthetic resin material containing no fluorescent material; a plurality of ultraviolet LED units inserted into the double fluorescent tubular body and connected with one another through lead wires flexibly, each of the plurality of ultraviolet LED units being provided with one or more ultraviolet light emitting devices; and the lead wires being led out to an outside of the double fluorescent tubular body for supplying electric power to the plurality of ultraviolet LED units.

In the LED fluorescent lamp configured thus, one or more ultraviolet light emitting devices of each of the plurality of ultraviolet LED units inserted in the double fluorescent tubular body are supplied with electric power through the lead wires which are led out to the outside of the double fluorescent tubular body. Thus, ultraviolet rays are emitted from the plurality of ultraviolet light emitting devices. When the emitted ultraviolet rays strike the layer of the double fluorescent tubular body containing the fluorescent material, the fluorescent material emits light in its own fluorescent color. Accordingly, the double fluorescent tubular body as a whole emits light so that the surroundings are illuminated with the light. Thus, the LED fluorescent lamp can be used for illumination. There are fluorescent materials in various emission colors including light's three primary colors of red, green and blue. In combination of these fluorescent materials, not only white color but also an emission color such as daylight color close to white color or the like can be produced. In addition, the LED fluorescent lamp can also entertain a user with various emission colors other than white color as illuminations for illuminating.

Here, in the LED fluorescent lamp according to the present invention, the fluorescent tubular body has a double structure of a layer containing a fluorescent material and a layer containing no fluorescent material. Therefore, when the fluorescent tubular body is made as thick as that of the LED fluorescent lamp aforementioned above, the layer containing the fluorescent material becomes thin. Thus, the quantity of the fluorescent material used can be reduced so that the cost of the LED fluorescent lamp can be reduced. In addition, when the layer containing the fluorescent material is disposed in the outer side, ultraviolet rays emitted from the ultraviolet light emitting devices pass through the layer containing no fluorescent material, and then strike the layer containing the fluorescent material so as to emit fluorescence from the layer containing the fluorescent material. On the contrary, when the layer containing the fluorescent material is disposed in the inner side, ultraviolet rays emitted from the ultraviolet light emitting devices strike the layer containing the fluorescent material so as to emit fluorescence from the layer containing the fluorescent material. Then, the emitted fluorescence is irradiated to the outside through the layer containing no fluorescent material.

In addition, the double fluorescent tubular body is made of a deformable synthetic resin material, and the plurality of ultraviolet LED units inserted in the double fluorescent tubular body are connected with one another flexibly through the lead wires. Accordingly, the double fluorescent tubular body can be bent into any desired shape so as to be attached easily in the desired shape for illumination. In addition, a character, a symbol, or the like, can be drawn by one or more LED fluorescent lamps, and a character string or the like can be formed by a plurality of LED fluorescent lamps. Accordingly, the LED fluorescent lamps can be used as a substitute for a neon sign.

Such an LED fluorescent lamp can be manufactured as follows. That is, a plurality of ultraviolet LED units connected with one another flexibly through lead wires are merely inserted in a double fluorescent tubular body processed into a tubular shape out of a transparent or semi-transparent deformable synthetic resin material containing a fluorescent material and a transparent or semi-transparent deformable synthetic resin material containing no fluorescent material by extrusion molding or the like, while the synthetic resin material containing the fluorescent material is disposed on the outer or inner side of the synthetic resin material containing no fluorescent material. Therefore, the process of degassing/sealing or the attachment of a complicated lighting circuit required in a background-art fluorescent lamp is dispensed with. Thus, the LED fluorescent lamp can be manufactured extremely easily. In addition, since no mercury is used, there is no problem in environmental pollution. Further, the lives of the ultraviolet light emitting devices are so long that exchange into new ones is not required for a long period of time. Thus, the LED fluorescent lamp can be used for a long period of time 10 or more times as long as a background-art fluorescent lamp.

In such a manner, an illumination system which takes the place of a background-art fluorescent lamp, which is manufactured easily, which can entertain a user with light emission in the user's favorite colors, which has a long life and can be reduced in cost, and which can be deformed desirably to thereby make a free light expression, is realized.

According to a further aspect of the present invention, there is provided an LED fluorescent lamp constituted by: a tubular body formed out of a transparent or semi-transparent deformable synthetic resin material processed into a tubular shape; a fluorescent layer containing a fluorescent material made of one or more inorganic or organic materials emitting light in response to irradiation with ultraviolet rays, the fluorescent layer being applied to an outer surface or an inner surface of the tubular body; a plurality of ultraviolet LED units inserted into the tubular body and connected with one another through lead wires flexibly, each of the plurality of ultraviolet LED units being provided with one or more ultraviolet light emitting devices; and the lead wires being led out to an outside of the tubular body for supplying electric power to the plurality of ultraviolet LED units.

In the LED fluorescent lamp configured thus, one or more ultraviolet light emitting devices of each of the plurality of ultraviolet LED units inserted in the tubular body are supplied with electric power through the lead wires which are led out to the outside of the tubular body. Thus, ultraviolet rays are emitted from the plurality of ultraviolet light emitting devices. When the emitted ultraviolet rays strike the fluorescent layer containing the fluorescent material applied to the inner surface or the outer surface of the tubular body, the fluorescent material emits light in its own fluorescent color. Accordingly, the tubular body as a whole emits light so that the surroundings are illuminated with the light. Thus, the LED fluorescent lamp can be used for illumination. There are fluorescent materials in various emission colors including light's three primary colors of red, green and blue. In combination of these fluorescent materials, not only white color but also an emission color such as daylight color close to white color or the like can be produced. In addition, the LED fluorescent lamp can also entertain a user with various emission colors other than white color as illuminations for illuminating.

In addition, the tubular body is made of a deformable synthetic resin material, and the plurality of ultraviolet LED units inserted in the tubular body are connected with one another flexibly through the lead wires. Accordingly, the tubular body can be bent into any desired shape so as to be attached easily in the desired shape for illumination. In addition, a character, a symbol, or the like, can be drawn by one or more LED fluorescent lamps, and a character string or the like can be formed by a plurality of LED fluorescent lamps. Accordingly, the LED fluorescent lamps can be used as a substitute for a neon sign.

Such an LED fluorescent lamp can be manufactured as follows. That is, a plurality of ultraviolet LED units connected with one another flexibly through lead wires are merely inserted in a tubular body which is processed into a tubular shape out of a transparent or semi-transparent deformable synthetic resin material by extrusion molding or the like while the outer surface or the inner surface of the tubular body is coated with a fluorescent layer containing a fluorescent material. Therefore, the process of degassing/sealing or the attachment of a complicated lighting circuit required in a background-art fluorescent lamp is dispensed with. Thus, the LED fluorescent lamp can be manufactured extremely easily. In addition, since no mercury is used, there is no problem in environmental pollution. Further, the lives of the ultraviolet light emitting devices are so long that exchange into new ones is not required for a long period of time. Thus, the LED fluorescent lamp can be used for a long period of time 10 or more times as long as a background-art fluorescent lamp.

In such a manner, an illumination system which takes the place of a background-art fluorescent lamp, which is manufactured easily, which can entertain a user with light emission in the user's favorite colors, which has a long life, and which can be deformed desirably to thereby make a free light expression, is realized.

According to a still further aspect of the present invention, in the above configurations of the LED fluorescent lamp, in each of the ultraviolet LED units, the one or more ultraviolet light emitting devices are disposed on a substrate.

In the LED fluorescent lamp configured thus, because one or more ultraviolet light emitting devices are disposed on the substrate, in addition to the effect described above, attachment of the ultraviolet light emitting devices is easy and wiring can be performed easily by use of printed wiring. Accordingly, reduction in cost can be realized.

In such a manner, an illumination system which takes the place of a background-art fluorescent lamp, which is manufactured more easily and more inexpensive, which can entertain a user with light emission in a variety of the user's favorite colors, which has a long life, and which can be deformed desirably to thereby make a free light expression, is realized.

According to another aspect of the present invention, in the above configurations of the LED fluorescent lamp, synthetic resin material is transparent silicone rubber.

In addition to the effect described above, the transparent silicone rubber is excellent in mixing property with the fluorescent material, superior in transmission of ultraviolet rays or visible light rays, and easy to be processed into a tubular shape by extrusion molding. In addition, the transparent silicone rubber is rich in flexibility so as to be deformed easily, while the flexibility does not deteriorate due to ultraviolet rays. Thus, the transparent silicone rubber is suitable as the synthetic resin material for the LED fluorescent lamp. The transparent silicone rubber may be mixed with a fluorescent material before being processed into a tubular shape. Alternatively, the transparent silicone rubber may be processed into a tubular shape before being coated with a fluorescent layer containing a fluorescent material. Thus, a user can be entertained with light emission in the user's favorite color by use of ultraviolet rays of the plurality of ultraviolet light emitting devices inserted in the tubular shape.

In such a manner, an illumination system which takes the place of a background-art fluorescent lamp, which is manufactured easily, which can entertain a user with light emission in a variety of the user's favorite colors, which has a long life, and which can be deformed desirably to thereby make a free light expression, is realized.

According to a further aspect of the present invention, in the above configurations of the LED fluorescent lamp, the fluorescent material is composed of a red fluorescent material emitting light in red in response to irradiation with ultraviolet rays, a green fluorescent material emitting light in green in response to irradiation with ultraviolet rays, and a blue fluorescent material emitting light in blue in response to irradiation with ultraviolet rays.

In such a manner, when the fluorescent materials emitting light in three colors of red, green and blue which are light's three primary colors are compounded as the fluorescent material used in the LED fluorescent lamp, not only is light emitted in white color or daylight color in the same manner as that in a background-art fluorescent lamp, but also light can be emitted in reddish white, greenish white or bluish white by changing the compounding ratio, in addition to the effect described above. Further, yellow can be made by mixing red and green, cyan can be made by mixing green and blue, and pink can be made by mixing red and blue. Thus, by compounding the fluorescent materials emitting light in light's three primary colors, light can be emitted in any color so that a user can be entertained with a rich variation of colors.

In such a manner, an illumination system which takes the place of a background-art fluorescent lamp, which is manufactured easily, which can entertain a user with light emission in a rich variety of the user's favorite colors, which has a long life, and which can be deformed desirably to thereby make a free light expression, is realized.

According to a still further aspect of the present invention, in the above configurations of the LED fluorescent lamp, each of the ultraviolet light emitting devices has a peak wavelength of light emitted therefrom in a range of from 360 nm to 400 nm.

Accordingly, in addition to the effect described above, the central emission wavelength of the ultraviolet light emitting devices becomes 380 nm. In spite of the name of "ultraviolet light emitting devices", the light emitted therefrom is of near ultraviolet rays long in wavelength. In addition, all the peak wavelengths of respective excitation spectra of the fluorescent materials emitting light in the three colors of red, green and blue which are light's three primary colors are in a range of from 360 nm to 400 nm. Fluorescence can be therefore emitted extremely efficiently. When the fluorescent materials emitting light in the three colors of red, green and blue are used, the LED fluorescent lamp becomes very bright.

Thus, the LED fluorescent lamp has no influence on health even if the ultraviolet light emitting devices are lit for a long time for illumination, while the LED fluorescent lamp can obtain very bright light emission.

This invention is not limited to the aforementioned descriptions of the mode for carrying out the invention and embodiments thereof at all, but includes various modifications that can be conceived by those skilled in the art without departing from the scope of claim for a patent.

What is claimed is:

1. A fluorescent tube comprising:
   a fluorescent tubular body containing a fluorescent material emitting light in response to irradiation with ultraviolet rays; and
   a light emitting diode substrate inserted in said fluorescent tubular body, said light emitting diode substrate including a substrate and one or more ultraviolet light emitting devices disposed on said substrate.

2. A fluorescent tube according to claim 1, wherein said fluorescent tubular body comprises:
   a glass tube; and
   a fluorescent layer being applied on one of an inner surface and an outer surface of said glass tube, and containing said fluorescent material.

3. A fluorescent tube according to claim 1, wherein said fluorescent tubular body comprises:
   a transparent resin tube; and
   a fluorescent layer being applied on one of an inner surface and an outer surface of said transparent resin tube, and containing said fluorescent material.

4. A fluorescent tube according to claim 1, wherein said fluorescent tubular body comprises a transparent resin containing said fluorescent material, said transparent resin is extrusion-molded into a pipe shape.

5. A fluorescent tube according to claim 1, wherein said fluorescent tubular body comprises:
   a first resin tube comprising a transparent or semi-transparent deformable synthetic resin; and
   a second resin tube comprising a transparent or semi-transparent deformable synthetic resin containing said fluorescent material, said second resin tube being disposed on one of an inner surface and an outer surface of said first resin tube.

6. A fluorescent tube according to claim 1, wherein said fluorescent tubular body comprises a transparent or semi-transparent deformable synthetic resin containing said fluorescent material dispersed in a whole of said deformable synthetic resin.

7. A fluorescent tube according to claim 1, wherein said fluorescent tubular body comprises:
   a resin tube comprising a transparent or semi-transparent deformable synthetic resin; and
   a fluorescent layer being applied on one of an inner surface and an outer surface of said resin tube, and containing said fluorescent material.

8. A fluorescent tube according to claim 5, wherein said transparent or semi-transparent deformable synthetic resin is silicone rubber.

9. A fluorescent tube according to claim 6, wherein said transparent or semi-transparent deformable synthetic resin is silicone rubber.

10. A fluorescent tube according to claim 7, wherein said transparent or semi-transparent deformable synthetic resin is silicone rubber.

11. An fluorescent tube according to claim 1, wherein said fluorescent material comprises a red fluorescent material emitting light in red in response to irradiation with ultraviolet rays, a green fluorescent material emitting light in green in response to irradiation with ultraviolet rays, an d a blue fluorescent material emitting light in blue in response to irradiation with ultraviolet rays.

12. A fluorescent tube according to claim 1, wherein said fluorescent material comprises lanthanum sulfide activated with trivalent europium and trivalent samarium, which is substantially expressed by a general formula $(La_{1-x-y}Eu_xSm_y)_2O_2S$, wherein x and y designate numbers, respectively, satisfying $0.01 \leq x \leq 0.15$ and $0.0001 > y > 0.03$.

13. A fluorescent tube according to claim 1, wherein said fluorescent material comprises aluminate activated with bivalent europium and bivalent manganese, which is substantially expressed by a general formula a $(M1,Eu,Mn)O \cdot bAl_2O_3$, wherein M1 designates at least one element selected from the group of Mg, Ca, Sr, Ba, Zn, Li, Rb, and Cs, and a and b designate numbers, respectively, satisfying a>0, b>0, and $0.2 \leqq a/b \leqq 1.5$.

14. A fluorescent tube according to claim 1, wherein said fluorescent material comprises holophosphate activated with bivalent europium, which is substantially expressed by a general formula $(M2,Eu)_{10}(PO_4)_6 \cdot Cl_2$ (in the formula, M2 designates at least one element selected from the group of Mg, Ca, Sr, and Ba).

15. A fluorescent tube according to claim 1, wherein said fluorescent material comprises aluminate activated with bivalent europium, which is substantially expressed by a general formula $a (M1,Eu)O \cdot bAl_2O_3$, wherein M1 designates at least one element selected from the group of Mg, Ca, Sr, Ba, Zn, Li, Rb, and Cs, and a and b designate numbers, respectively, satisfying a>0, b>0, and $0.2 \leqq a/b \leqq 1.5$.

16. A fluorescent tube according to claim 1, wherein each of said ultraviolet light emitting devices has an emission wavelength in a range of from 360 nm to 400 nm.

17. A fluorescent tube according to claim 1, wherein each of said ultraviolet light emitting devices is formed a nitride semiconductor formed of at least one of selected from the group of AlGaInN, AlGaN, GaN, and InGaN.

18. A fluorescent tube according to claim 1, wherein in said light emitting diode substrate, said plurality of ultraviolet light emitting devices are arranged linearly on said substrate.

19. A fluorescent tube according to claim 1, wherein said light emitting diode substrate comprises a plurality of light emitting diode unit substrates which are connected to each other, each of said ultraviolet light emitting diode unit substrates having one or more ultraviolet light emitting devices disposed linearly.

20. A fluorescent tube according to claim 1, wherein said ultraviolet light emitting device is disposed on said light emitting diode substrate while being sealed by transparent resin.

21. A fluorescent tube according to claim 5, wherein said light emitting diode substrate comprises a plurality of light emitting diode unit substrates which are connected to each other through a lead wire flexibly, each of said ultraviolet light emitting diode unit substrates having one or more ultraviolet light emitting devices disposed linearly.

22. A fluorescent tube according to claim 6, wherein said light emitting diode substrate comprises a plurality of light emitting diode unit substrates which are connected to each other through a lead wire flexibly, each of said ultraviolet light emitting diode unit substrates having one or more ultraviolet light emitting devices disposed linearly.

23. A fluorescent tube according to claim 7, wherein said light emitting diode substrate comprises a plurality of light emitting diode unit substrates which are connected to each other through a lead wire flexibly, each of said ultraviolet light emitting diode unit substrates having one or more ultraviolet light emitting devices disposed linearly.

24. A fluorescent tube according to claim 1, further comprising a cover fitted in an end of said fluorescent tubular body, said cover having support means protruding from said cover toward into an inside of said fluorescent tubular body and being coupled with said light emitting diode substrate to thereby support said light emitting diode substrate in a vicinity of an inside center of said fluorescent tubular body.

\* \* \* \* \*